US006488900B1

(12) United States Patent
Call et al.

(10) Patent No.: US 6,488,900 B1
(45) Date of Patent: Dec. 3, 2002

(54) METHOD AND APPARATUS FOR AIR PURIFICATION

(75) Inventors: Charles J. Call, Pasco, WA (US); Mike Powell, Kennewick, WA (US); Seung-Ho Hong, Richland, WA (US); Ezra Merrill, Albuquerque, NM (US); Alireza Shekarriz, Columbia, MD (US); Patrick Call, West Richland, WA (US)

(73) Assignee: MesoSystems Technology, Inc., Kennewick, WA (US)

( * ) Notice: Subject to any disclaimer, the term of this patent is extended or adjusted under 35 U.S.C. 154(b) by 0 days.

(21) Appl. No.: 09/422,206

(22) Filed: Oct. 19, 1999

Related U.S. Application Data

(60) Provisional application No. 60/105,041, filed on Oct. 20, 1998.

(51) Int. Cl.[7] .......................... B01D 53/34; A62B 11/00

(52) U.S. Cl. ....................... 422/173; 422/120; 422/122; 422/125; 422/174; 422/177; 422/180

(58) Field of Search ................................ 422/120, 122, 422/125, 173, 174, 177, 180; 423/210; 588/200

(56) References Cited

U.S. PATENT DOCUMENTS 3,469,934 A 9/1969 Bocard et al. .............. 423/220
5,326,537 A 7/1994 Cleary ........................ 422/173
5,914,091 A 6/1999 Holst et al. ................. 422/173

*Primary Examiner*—Hien Tran
(74) *Attorney, Agent, or Firm*—Ronald M. Anderson

(57) ABSTRACT

A method and apparatus for purifying air to deactivate toxic chemical and biological species such as Sarin, mustard gas, phosgene, cyanogen chloride, Anthrax spores, *E. coli* bacteria, Salmonella bacteria, Hepatitis virus, and Norwalk virus. The apparatus comprises a reaction chamber coupled to a counterflow heat exchanger. Incoming contaminated air is directed through a heating side of a counterflow heat exchanger to preheat it. The air is further heated to a temperature of at least 200° C., which is sufficient to deactivate common biological toxic species. Optionally, the reaction chamber may include a catalyst on a surface area over which the heated air is directed, which enables a thermocatalytic reaction that is particularly effective in deactivating biological and chemical warfare agents, such as anthrax and Sarin. Portable embodiments of the invention are useful in both military and civilian air purifying applications, while fixed installation of the apparatus are useful in deactivating toxic species from the air in areas where food is prepared or stored, or in purifying air in the environment of a living space.

46 Claims, 14 Drawing Sheets

METHOD AND APPARATUS FOR AIR PURIFICATION

RELATED APPLICATION

This application is based on a prior copending provisional application, Ser. No. 60/105,041, filed on Oct. 20, 1998, the benefit of the filing date of which is hereby claimed under 35 U.S.C. §§119(e).

GOVERNMENT RIGHTS

This invention was made under contract with the United States Defense Advanced Research Projects Agency (DARPA), under Contract No. DABT63-98-C-0054. The United States Government may have certain rights in the invention.

FIELD OF THE INVENTION

The present invention generally concerns air purification, and more specifically, the purification of air that contains toxic species, using high-temperature processing.

BACKGROUND OF THE INVENTION

In recent years, there has been considerable concern by the military that troops may enter war zones and be exposed to air contaminated with toxic chemical and/or biological agents. Examples of such toxic chemical agents include Sarin, mustard gas (bis(2-chloroethyl)thioether), phosgene, and cyanogen chloride; examples of biological agents include Anthrax, *E. coli,* Salmonella, Hepatitis, and Norwalk virus. Although outlawed by worldwide treaties, the use of such warfare agents in military conflicts is a strong possibility and poses a serious threat to both military and civilian personnel.

There are several known methods for removing or destroying chemical species from contaminated air, including adsorption by carbon, photo-catalytic oxidation and thermocatalytic oxidation. In addition, methods for removing or destroying airborne bacteria particulates include filtration, photo-catalytic oxidation, and thermocatalytic oxidation. Apparatus useful for employing these methods are also well known in the art.

While the foregoing methods (and their associated apparatus) are suitable in certain instances, they may not produce viable results in the field under warfare conditions. For example, a specific air filtration device may remove certain types of toxic biological species, such as bacteria, while not removing other toxic species, such as viruses, or may not be able to reduce the concentration level of a particular toxic species to an acceptable level. Furthermore, the devices used to implement the methods may require heavy or bulky equipment that is impractical for use by personnel in the field, who need to be provided with lightweight devices. It would therefore be desirable to provide a compact air purification device capable of removing and/or reducing toxic warfare agents to an acceptable level that can be worn or used by ground troops and others who may be exposed to these agents.

Another problem that is frequently encountered is the unknowing consumption of food containing toxic species such as *E. coli,* Salmonella, or Hepatitis. Each of these toxins can be harmful when ingested by humans, causing death in some circumstances. Food is sometimes contaminated with these toxins during food processing operations, or may be contaminated through contact with air containing such toxins, due to inadequate sealing of the food and/or inadequate refrigeration, or prolonged refrigeration. For instance, raw eggs commonly are infected with Salmonella, and *E. coli* is often found in animal waste and can contaminate meat processed in plants that apply inadequate or improper procedures. Additionally, unpasteurized fruit products such as fruit juices may be contaminated with *E. coli* if made with fruit that has come into contact with animal waste. Furthermore, ethylene oxide and other chemical contaminants increase the rate at which food spoils in confined spaces such as refrigerators. It would therefore be desirable to provide apparatus for purifying air in food processing plants, cold storage facilities, and refrigerators; the apparatus should be capable of removing or deactivating a substantial portion of any toxic species present in the air in such facilities. It would also be beneficial to provide a similar device for removing ammonia, amines, and other organic chemicals for the air in semiconductor processing plant environments.

SUMMARY OF THE INVENTION

The present invention addresses the foregoing problems by providing a process and associated apparatus for purifying air that is particularly useful in removing or deactivating toxic chemical and biological species such as Sarin, mustard gas, phosgene, cyanogen chloride, ammonia, ethylene oxide, Anthrax spores, *E. coli* bacteria, salmonella bacteria, Hepatitis virus, listeria, legionella, and Norwalk virus. The apparatus can be configured in different embodiments, including those that employ a noble metal catalyst to facilitate a thermocatalytic deactivation of a vast majority of the toxic chemical and biological species present in the air. One or more embodiments is sufficiently portable for use on the battlefield, and other embodiments for removing toxic species from areas in which food is prepared or stored.

According to a first aspect of the invention, air purification apparatus include a thermocatalytic reactor coupled to a counterflow heat exchanger. The thermocatalytic reactor has an enclosed passage with a surface area comprising a noble metal catalyst over which heated air is directed to flow. The noble metal catalyst promotes a thermocatalytic reaction that deactivates at least 90% of any toxic chemical and biological species present in the air. The counterflow heat exchanger greatly increases the thermal efficiency of the process by substantially heating the contaminated air that enters the apparatus and cooling the air that leaves the thermocatalytic reactor so that the air is nearly at ambient temperature when it exits the apparatus. The noble metal catalyst preferably is platinum, or palladium, or a combination of the two. The air is preferably heated to at least 200° C., and more preferably to at least 300° C., using an electric resistance heater, or a light hydrocarbon combustor, or other heat source. The apparatus is especially well suited for removing and/or deactivating toxic species having a size less than 10 $\mu$m and a concentration level less than 50,000 parts per million (ppm).

According to a second aspect of the invention is directed to portable air purification apparatus incorporating substantially the same components as the foregoing apparatus, but in a reduced size. Included is a reaction chamber in which the air is preferably heated to a sufficient temperature to deactivate toxic biological species commonly associated with food poisoning, such as salmonella bacteria and *E. coli* bacteria. The portable apparatus may optionally include a catalyst element that is suited for use in the thermocatalytic deactivation of toxic warfare agents, such as nerve gases and chemical agents. The counterflow heat exchanger preferably comprises a plurality of thin plates that are stacked in an alternating fashion such that heat is exchanged between an incoming stream of contaminated air and an exiting stream of purified air, in a counterflow heat exchanger configuration.

According to further aspects of the invention, various scavenger apparatus are disclosed for purifying larger quantities of air, such as in a food processing plant or clean room. The scavenger apparatus comprise various external configurations, including cylindrical and cubic shapes. Included is a counterflow heat exchanger in fluid communication with a reaction chamber in which contaminated air is thermally and/or thermocatalytically deactivated, in the manner discussed above.

According to another aspect of the invention, a process for purifying air contaminated with toxic biological and/or chemical species is defined. The process can be implemented with the foregoing apparatus, and begins by directing contaminated air, e.g., from the ambient, through a heating fluid path through a counterflow heat exchanger, wherein the air is heated to a temperature substantially above ambient. The air is preferably heated to at least 200° C., and more preferably to at least 300° C., whereupon it is passed over a surface comprising a noble metal catalyst. The catalyst purifies the air by creating a thermocatalytic reaction that deactivates a substantial portion of the toxic biological and chemical species present in the air. The purified air is then directed along a cooling path through the counterflow heat exchanger and cooled by heat transfer with the air eitering the apparatus. The temperature of the purified air exiting the heat exchanger is close to ambient.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 12A:
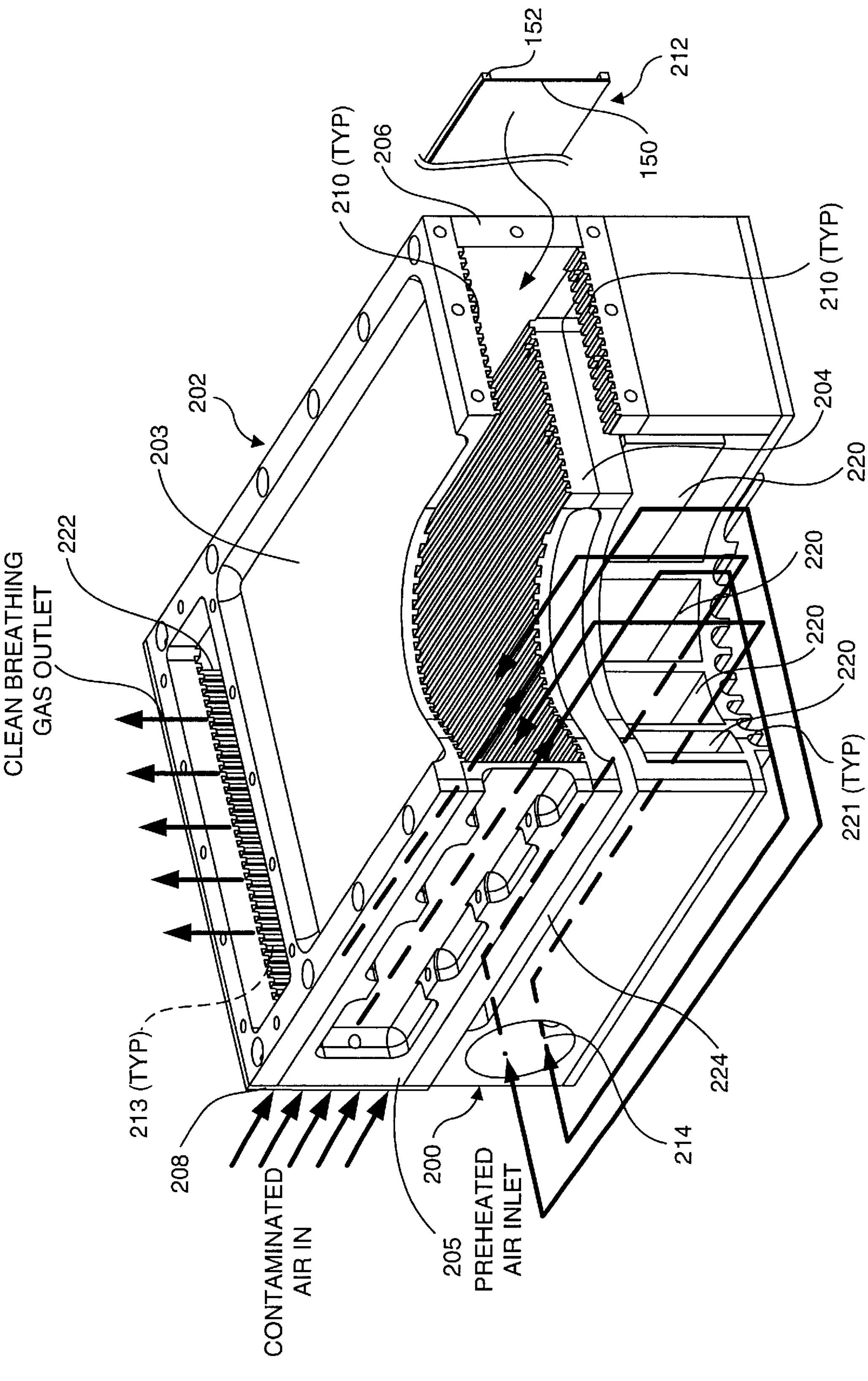
Figure 12B:
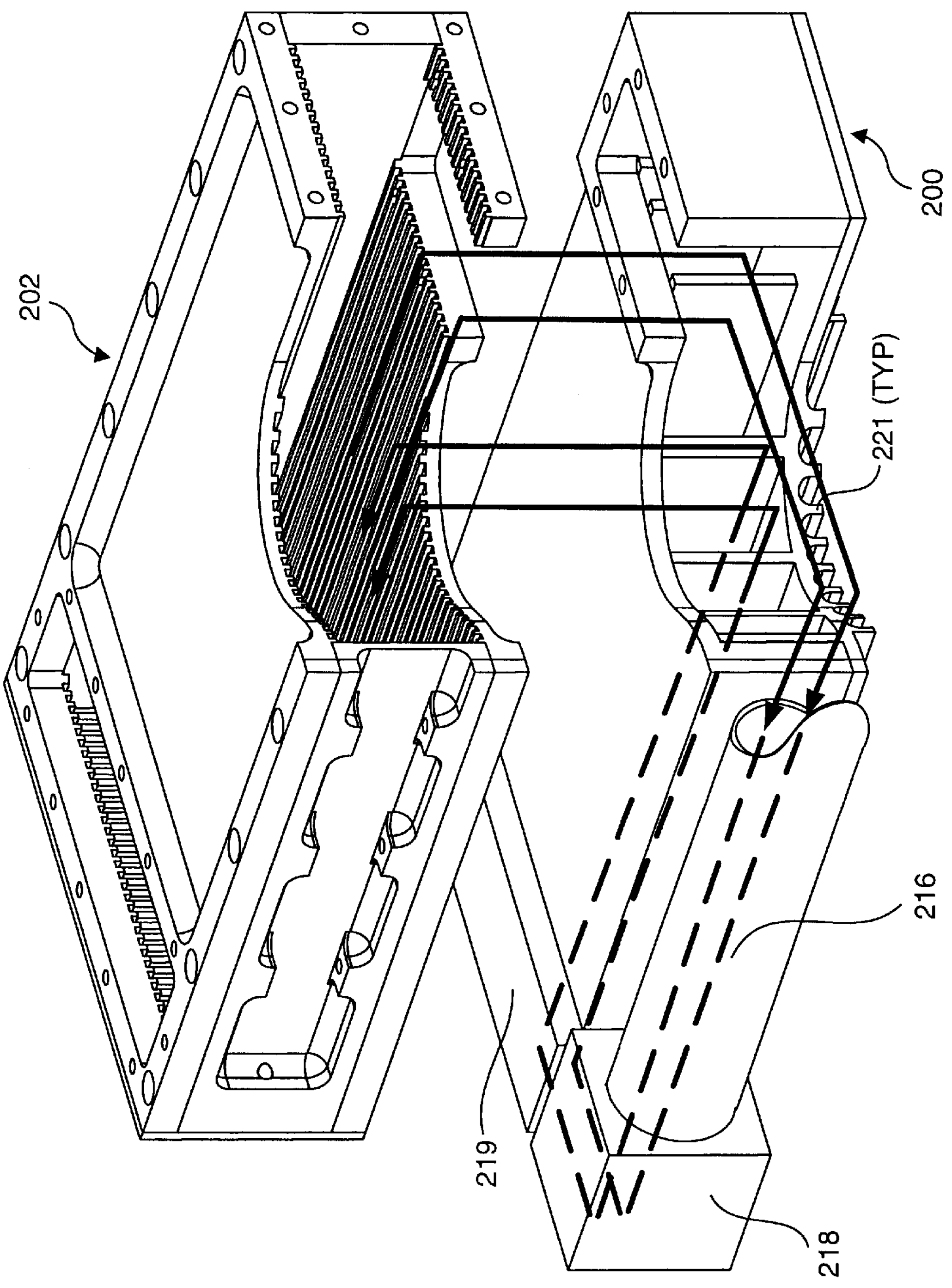
Figure 12C:
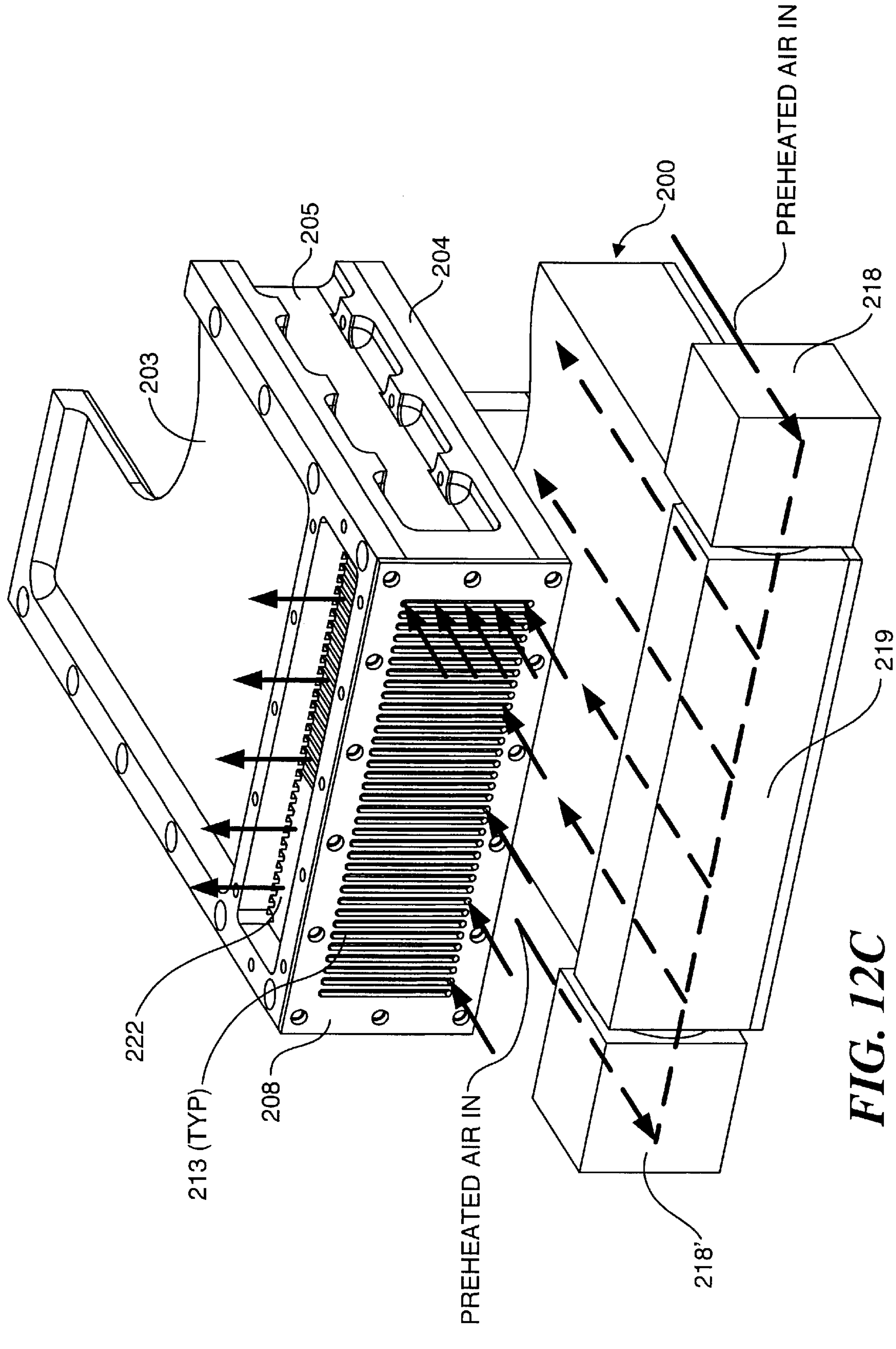
Figure 13A:
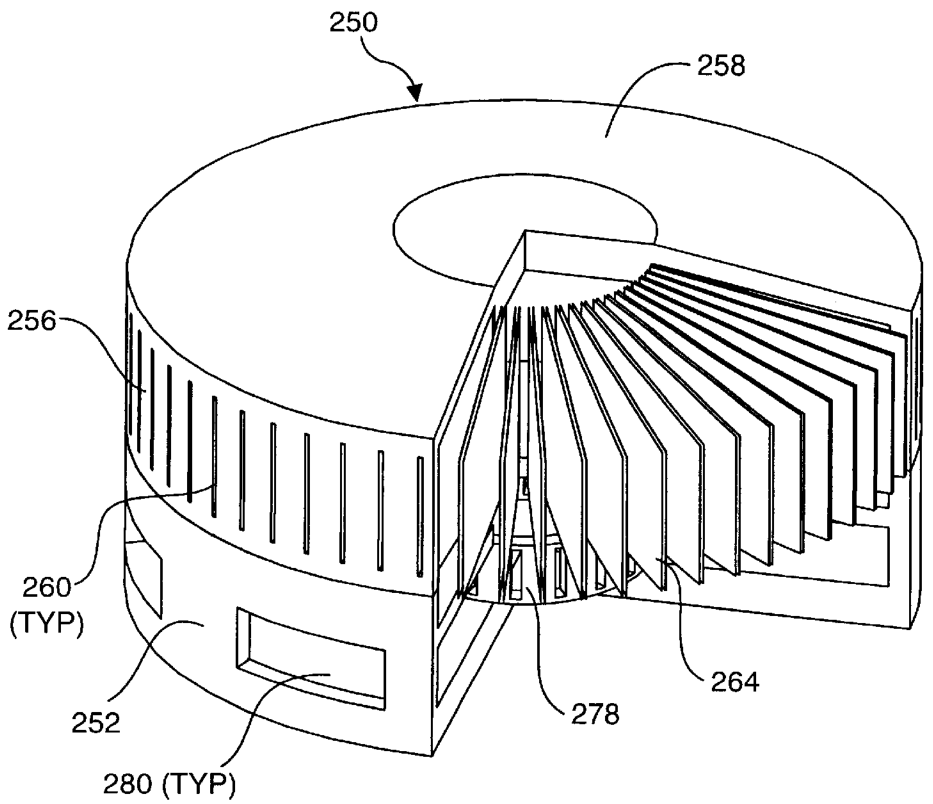
Figure 13B:
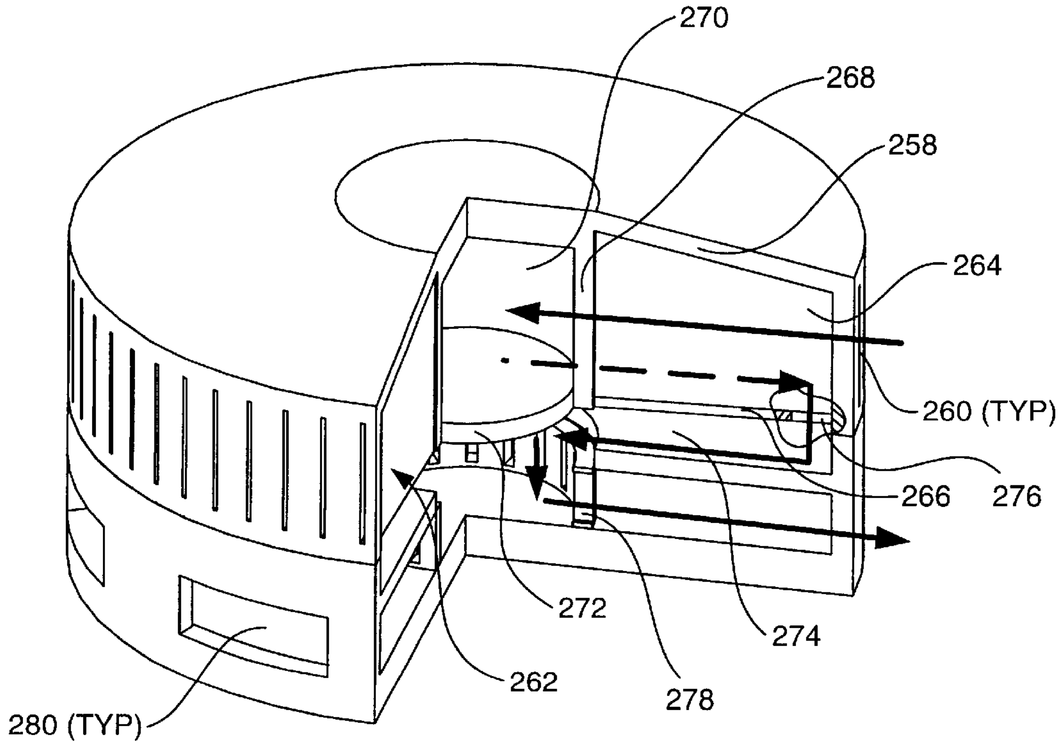
Figure 14:
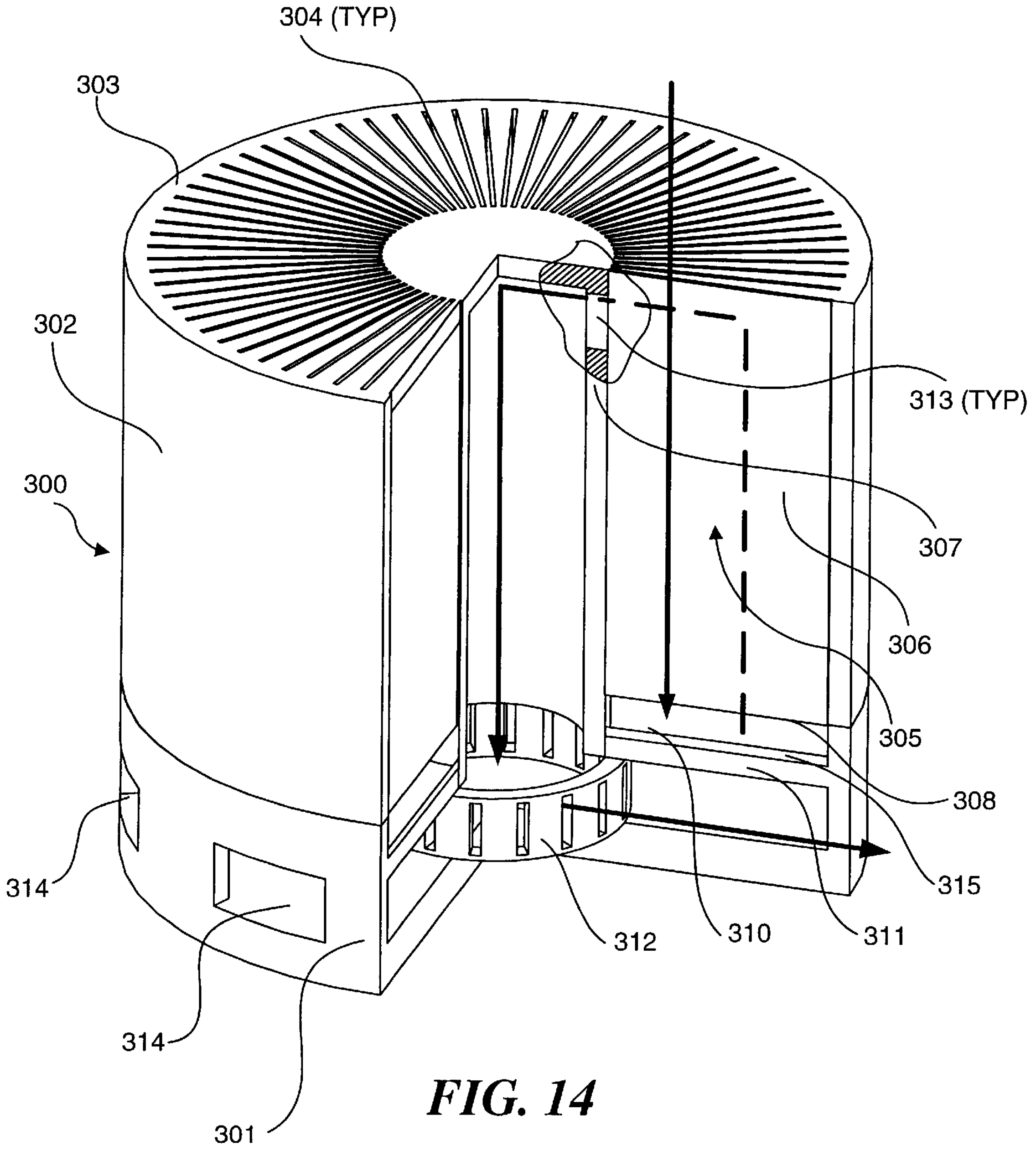
Figure 15:
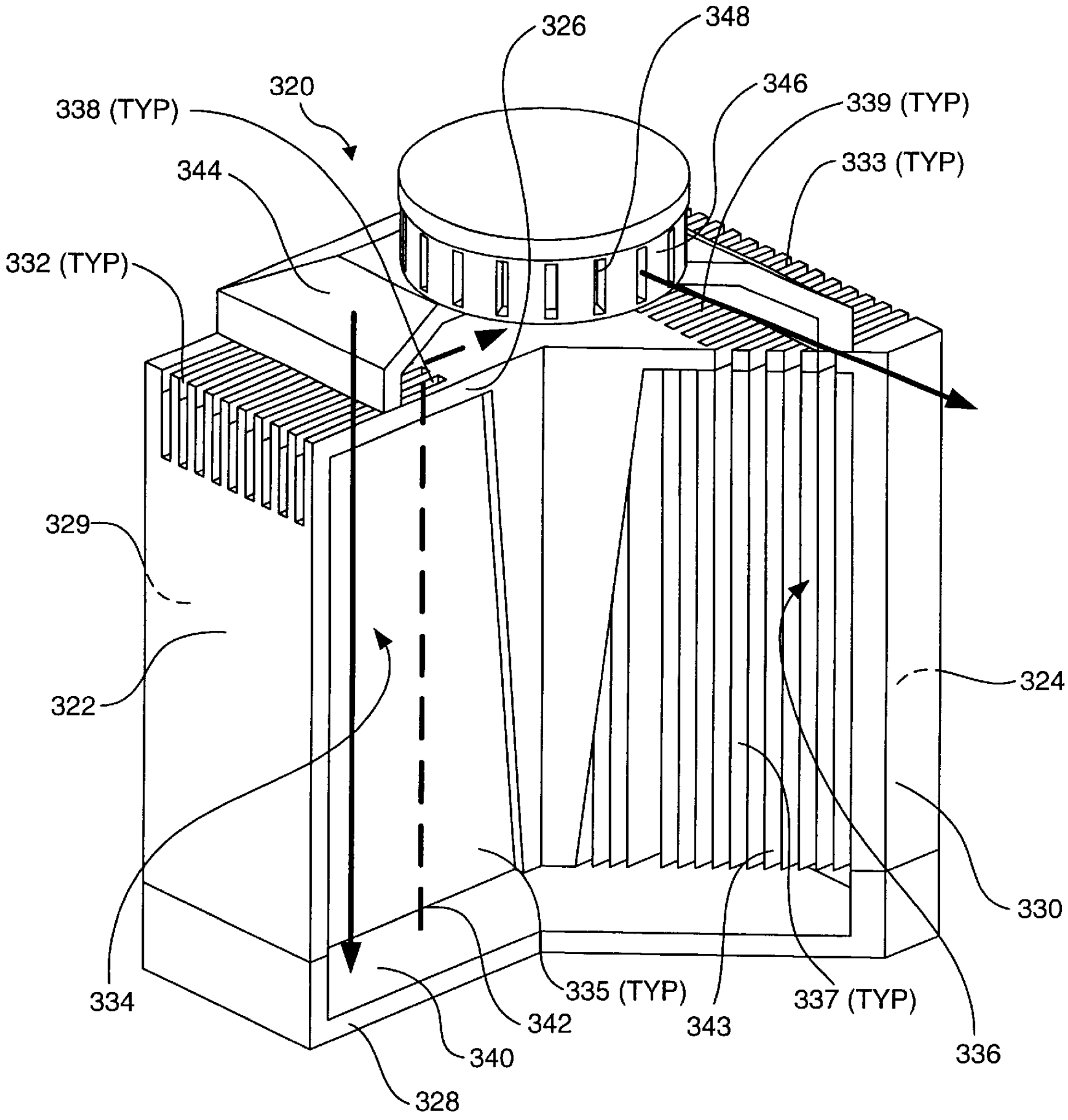

FIGS. 12A–C are isometric cut-away views of a second exemplary portable air purification apparatus, in accord with the present invention;

FIGS. 13A and 13B are isometric cut-away views of a first exemplary scavenger air purification apparatus, in accord with the present invention;

FIG. 14 is an isometric cut-away view of a second exemplary scavenger air purification apparatus, in accord with the present invention; and FIG. 15 is an isometric cut-away view of a third exemplary scavenger air purification apparatus, in accord with the present invention.

DESCRIPTION OF THE PREFERRED EMBODIMENT

The present invention concerns an apparatus that is used for purifying gases, such as air, containing toxic organic, inorganic, and/or biological species. The term "organic, inorganic, or biological species" as used herein refers to organic and/or inorganic particles, bacteria, and/or viruses, having a size less than 10 □m and which cause harm, illness, and/or death in humans. Examples of well-known toxic agents that are of concern include Sarin, mustard gas (bis (2-chloroethyl)thioether), phosgene, cyanogen chloride, ammonia, ethylene oxide, Anthrax, *E. coli,* Salmonella, Hepatitis, listeria, legionella, and Norwalk virus. The invention preferably uses a thermal deactivation process to purify air contaminated with biological toxins such as *E. coli,* and in one preferred embodiment, purifies air contaminated with toxic agents through a thermocatalytic process.

The term "deactivate" as used herein with reference to a chemical compound means that the compound is oxidized, decomposed, combusted, or otherwise chemically reacted to form lower molecular weight species that are less toxic than the species from which they originated. With reference to biological species, "deactivate" means that the species are made non-viable. The term "less toxic" as used herein means that the less toxic species do not, on average, cause harmful symptoms as severe in humans, at the same exposure level as the "toxic" species from which they originated.

It is known that many toxic biological species can be deactivated by exposing such species to high temperatures. For example, it is recommended that meat be heated to a temperature of at least 160° F. to ensure that any *E. coli* bacteria in the meat are killed. This is the basic principle behind the thermal deactivation process, wherein a gas such as air is heated to a sufficient temperature to thermally deactivate a substantial portion of any toxic biological species present in the gas. It has been shown that this process is particularly effective when the heated gas is passed through (or over) a porous material, such as a porous ceramic or metal, which provides a capture surface for "capturing" (i.e. holding onto) the toxic biological species in the contaminated air for a sufficient time to thermally deactivate the toxic biological species. Preferably, the porous material comprises a material that provides a high surface area/volume ratio and allows air to pass through (or over) it in a tortuous flow path, so that the toxic biological species can be captured for a sufficient time to be thermally deactivated.

Although the foregoing thermal deactivation process is effective at deactivating biological species, it may not provide a desired level of effectiveness in removing certain organic chemical toxins, such as chemical warfare agents. Experimental research has shown that exposing a high-temperature gas containing such organic chemical toxins to certain catalysts causes a thermocatalytic reaction that deactivates a substantial portion of the toxins. This is the basic principle behind the thermocatalytic deactivation process.

Catalysts are used to precipitate, promote, and/or accelerate chemical reactions, but are not consumed in the process. Heterogeneous catalytic processes involve more than one phase (e.g., liquid, solid, or gas) and most often, a catalyst is in the solid phase, while the reactants and products are liquids and/or gases. Reactant molecules diffuse to and then adsorb upon the catalyst surface, which is often fabricated to have a relatively high surface area that is coated with a small amount of a catalytically active material, such as platinum or palladium. Once the reactants adsorb on the surface and encounter active catalyst sites (i.e., locations with catalyst material not already occupied by reactants or products), they typically dissociate into smaller fragments and react with fragments of other adsorbed species. Thermocatalytic processes are processes carried out in the presence of a catalyst at temperatures substantially elevated above ambient, i.e., substantially above 24° C.

The following examples are presented to illustrate simple thermocatalytic processes that are well known in the chemical art. The production of ammonia from hydrogen and nitrogen, for example, is typically carried out using an iron oxide catalyst at elevated temperatures and pressures. Molecules of hydrogen and nitrogen diffuse to and adsorb upon the iron oxide surface, where the molecules dissociate and react to form ammonia, which subsequently desorbs, thereby making the catalyst site available for adsorption of more reactants. The thermocatalytic oxidation of ethylene in air occurs by a similar process that uses a platinum catalyst. Ethylene and oxygen molecules adsorb onto the catalyst surface, where the oxygen is fragmented into oxygen radicals. These highly reactive radicals react with the adsorbed ethylene (and its oxidation products) forming water and carbon dioxide. The principal reaction for the thermocatalytic oxidation of ethylene is:

$$C_2H_4+3\ O_2 \rightarrow 2\ CO_2+2\ H_2O \quad (1)$$

As with most reactions involving the oxidation or reduction of complex molecules, there are many other reactions that also occur when oxidizing ethylene, resulting in the production of less-complex molecular structures, which in turn further combine to form carbon dioxide and water, and/or other compounds at low concentration levels. These reactions are omitted here for clarity.

In the thermocatalytic embodiment of the present invention, air containing toxic organic, and/or biological species is heated in the presence of a catalyst preferably comprising a ceramic oxide and/or containing at least one noble metal to a temperature sufficient to thermocatalytically deactivate at least 90% of any such species present to less toxic organic species or non-viable biological species. Depending on the catalytic temperature and residence time of the catalytic process, the species may, for example, completely decompose to hydrogen and carbon-oxygen compounds (typically, at higher temperatures), or may be partially decomposed to non-harmful or substantially less harmful compounds. The air to be purified initially contains toxic contaminants in a concentration of less than 50,000 ppm, more preferably less than 20,000 ppm, and most preferably less than 10,000 ppm.

It is preferable that the thermal or thermocatalytic deactivation processes occur in a thermal reactor (i.e., reaction chamber), which may be heated by an external and/or internal heat source. Preferably, the temperature of the thermal reactor is at least 200° C., and more preferably at least 300° C.; but is preferably no greater than 500° C., more preferably no greater than 450° C., and most preferably no greater than 400° C. If a catalyst is used, the catalyst residence time (the amount of time that the air is in contact with the catalyst) is preferably at least 0.0001 second, and more preferably at least 0.001 second, most preferably at least 0.01 second; but is preferably no greater than 1 second, more preferably no greater than 0.1 second, and most preferably no greater than 0.05 second.

Preferably, the air is heated in a heat exchange device prior to entering the thermal reactor. The heat exchange device is configured in a counterflow arrangement so that heat is transferred to the air entering the device from the air exiting the thermal reactor, thereby heating the incoming stream and cooling the exiting stream. If the heat exchange device does not heat the incoming air to a sufficiently high temperature to carry out the thermal or thermocatalytic processes, additional heating devices may be provided to further heat the air to the desired temperature.

In the thermocatalytic embodiment, once heated to the appropriate temperature, the heated air is caused to contact the catalyst. The catalyst is preferably in the form of a porous surface over which the heated air passes, such as, for example, a platinum-coated surface formed on a substrate material having a relatively great surface area. Examples of such surfaces include porous silica, alumina, or porous metallic "foams," which are all known to one skilled in the art of catalysis. Further, the porous material used may be coated onto a metal or ceramic plate, or surface of a flow channel, or onto a mesh material, past or through which the contaminated air is circulated. In addition, a replaceable catalyst element comprising one or more of the foregoing surfaces and materials may be used. In this manner, heated contaminated air is caused to come into contact with the catalyst material, resulting in a thermocatalytic reaction that deactivates the toxic species contaminating the air.

The thermal reactor through which the air passes may be any device having an enclosed passage or passages with an inlet port and an outlet port that contains a surface coating of a catalyst, has been fabricated from a catalyst material, or contains a catalyst element. Suitable catalysts include ceramic oxides and noble metals, preferably platinum, or palladium. The thermocatalytic reactor may be heated by any suitable external heat source, such as a light hydrocarbon (e.g., butane, propane, natural gas) burner, or an electrical resistance heater, or a solar heater, or by available waste heat from another process.

Figure 1:
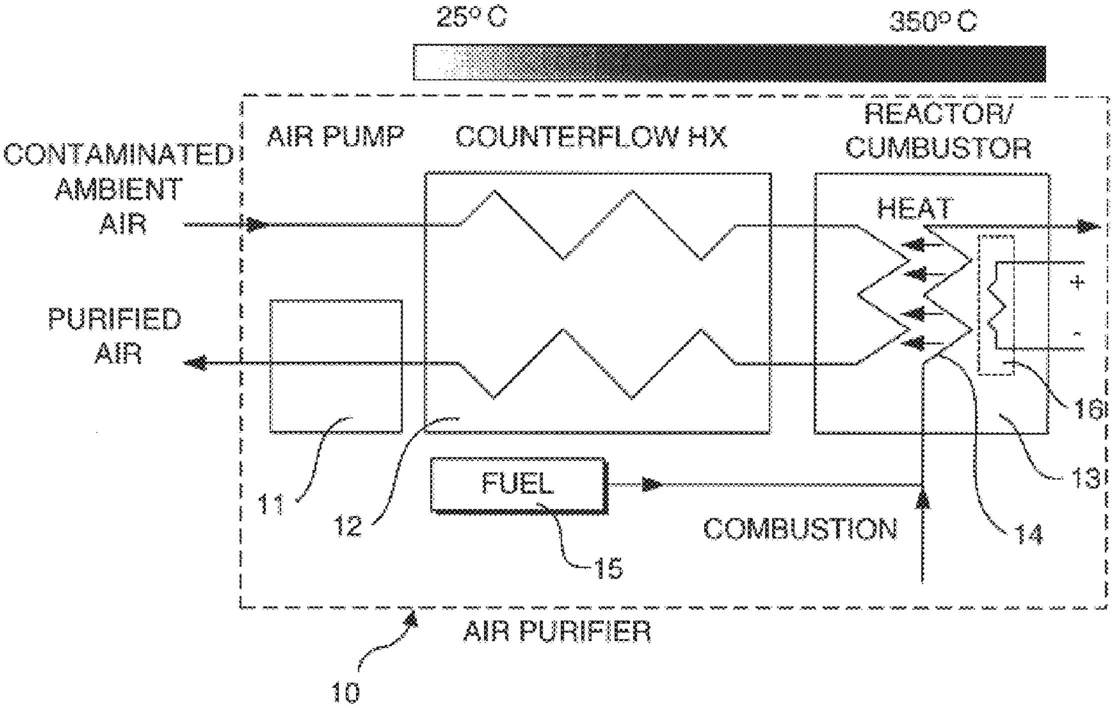
FIG. 1 is a schematic diagram illustrating the primary components used in the apparatus and process of the present invention.

A schematic diagram illustrating the primary components of an exemplary air purifier 10 according to the present invention is shown in FIG. 1. These components include an air pump or blower 11, a high-efficiency counterflow heat exchanger 12, and a reactor 13. Activation of blower 11 creates a pressure differential across the heat exchanger and reactor, causing air to flow through the purifier in the direction shown by the arrows in the Figure. As a stream of contaminated ambient air at a nominal temperature of 25° C. enters the purifier, it flows into counterflow heat exchanger 12, where it absorbs heat from an exiting stream of purified air. This heat exchange increases the temperature of the incoming contaminated air to approximately 350° C., whereupon the air enters reactor 13. Reactor 13 is maintained at a temperature of 350° C. or higher by an independent heat source, preferably comprising a combustor 14, supplied with fuel from a fuel source 15, or alternatively comprising an electric heater 16 energized from an AC voltage source, or a DC voltage source, such as a battery (not shown).

The temperature in the reactor (preferably at least 350° C.) is sufficient to deactivate most biological agents, thereby purifying the air, although temperatures in the range from 200–300° C. may also be acceptable, depending on the particular contaminants that are to be deactivated. Preferably, the reactor should also comprises a capture surface comprising a porous material over or through which contaminated gas is caused to flow. In the process of flowing over the capture surface, the toxic biological species may actually move from one capture site to another; however, the overall benefit of the capture surface is that it prevents the biological species from passing through the reactor too quickly. In addition, if it is desired to deactivate toxic chemical species such as warfare agents, the reactor may also comprise catalyst-coated capture surface areas or a catalyst element that induce destruction of such chemical species through a thermocatalytic reaction, as discussed above.

After being purified in the reactor, the purified air re-enters the heat exchanger, where it gives up heat to the incoming ambient air, lowering the temperature of the purified air to slightly above (preferably within 10–20° C. of) the ambient temperature. The cooled purified air then passes through blower 11, and is exhausted to the atmosphere, or ducted to a desired location.

An important aspect of the present invention corresponds to the design and/or selection of the high efficiency counterflow heat exchanger. Any suitable counterflow heat exchange device that permits a stream of incoming air to pass in a direction opposite to a stream of heated air exiting the catalytic reactor in such a manner that heat is exchanged between the two streams may be used for the heat exchanger in the system. However, it is preferable that this component comprise a "mesochannel" heat exchanger, which provides a substantial improvement in heat-transfer efficiency and a significant reduction in the overall size and weight of air purification apparatus in accord with the present invention. In a preferred embodiment, the mesochannel heat exchanger comprises a multi-layer assembly, including a plurality of stacked (or adjacently placed) generally planar enclosures (e.g., thin heat exchanger plates), each containing an internal flow channel through which the air is circulated. The flow channels preferably have a height and/or width, which is at least 0.01 mm, more preferably at least 0.1 mm, and most preferably at least 0.5 mm; but is preferably no greater than 100 mm, more preferably no greater than 50 mm, and most preferably no greater than 5 mm. The air being heated flows through a layer separate from, but adjacent to, a layer through which the heated air from the catalytic reactor flows and in a direction opposite to that of the heated air, so as to define a counterflow heat exchanger. Flow channels of the foregoing preferred dimensions are herein referred to as mesochannels, because they are within a mesoscale system range in size. By definition, mesoscale systems fall between the macroscale systems associated with traditional full-sized heat exchange systems, like those used in the petrochemical industry, and the microscale systems commonly encountered in the microelectronics industry.

If the exterior surface of the heat exchange device used in the present invention is insulated and the channels of the heat exchanger are within the range of preferred dimensions noted above, the air purification process requires very little input of heat due to the high efficiency of the mesochannel heat exchanger. Even though electrical energy is not required to power a heat source in this apparatus, in certain applications (such as those requiring only a few hours of operation at a time), a small, battery-powered heating element may comprise the most compact and economical heat source. Under preferred operating conditions, the contaminated air entering the heat exchanger should be at a temperature of less than 45° C., and while flowing within the heat exchanger, should be heated to a temperature of at least 200° C. before it passes over the catalyst surface. Further, before exiting the heat exchanger, the heated air should be cooled to a temperature of less than 50° C.

The components referred to herein for use in the present invention may be made of any suitable material and fabricated by any suitable process, but are preferably made from aluminum or nickel-based alloys. Milling processes may be used to form the channels in metal plates or sheets to create the heat exchange plates. The apparatus of the present invention preferably processes contaminated air at a flow rate of at least 10 liters/minute (1/min), more preferably at least 20 1/min, and most preferably at least 80 1/min.

Figure 2:
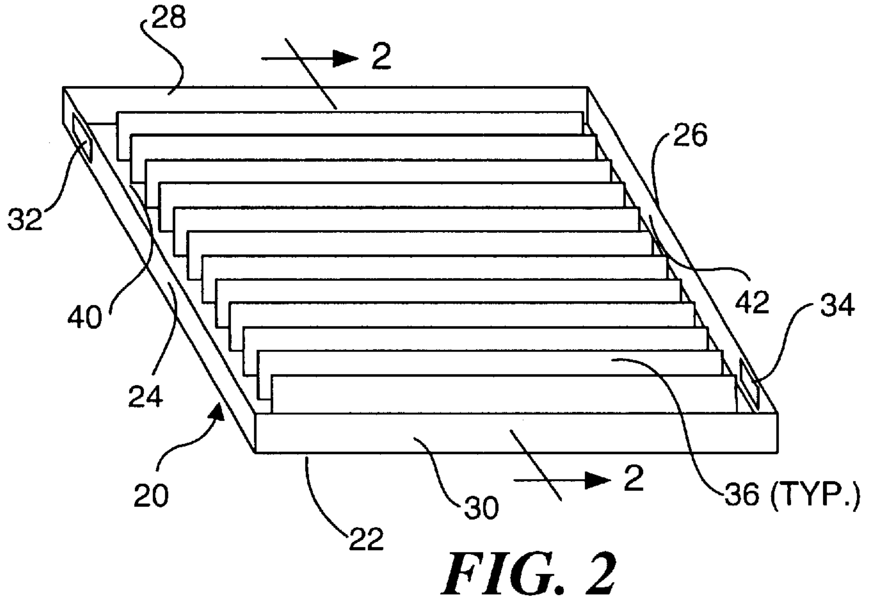
FIG. 2 is an isometric view of a plate heat exchanger plate used in a counterflow heat exchanger of the present invention.
Figure 3:
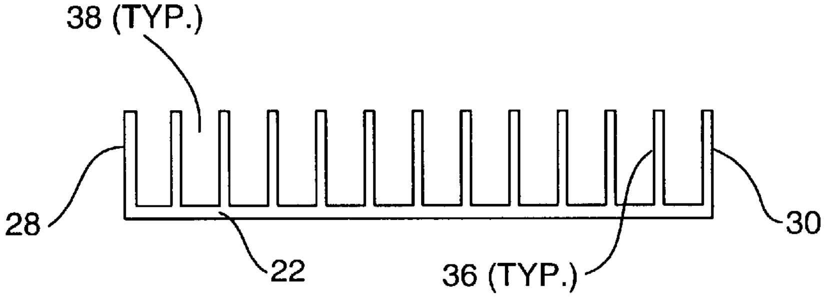
FIG. 3 is a cross-sectional view of the heat exchanger plate, taken along section line 2—2 of FIG. 2.

FIGS. 2 and 3 show an exemplary heat exchange plate 20 (with its cover plate removed to more clearly disclose the interior configuration), which is suitable for use in both the catalytic reactor and the counterflow heat exchanger. Heat exchange plate 20 comprises a generally planar bottom plate 22, sides 24 and 26, and ends 28 and 30. An inlet port 32 is defined in side 24 adjacent to end 28, while an outlet port 34 is defined in side 26 adjacent to end 30. A plurality of elongate and rectangular shaped parallel dividers 36 extend upwardly from the bottom plate to define multiple flow paths 38. The dividers extend across a majority of the bottom plate, but do not contact sides 24 and 26, so that the spacing between the ends of the dividers and the side form passages 40 and 42, respectively, extending generally parallel to and along the inner surfaces of sides 24 and 26. The arrangement of the dividers permit an incoming flow of air entering inlet port 32 to be divided among multiple flow paths 38, and then recombine on the opposite ends of the flow paths and exit the device through outlet port 34. A cover plate (not shown) is disposed on top of the dividers to close the open sides of the flow paths.

Figure 4:
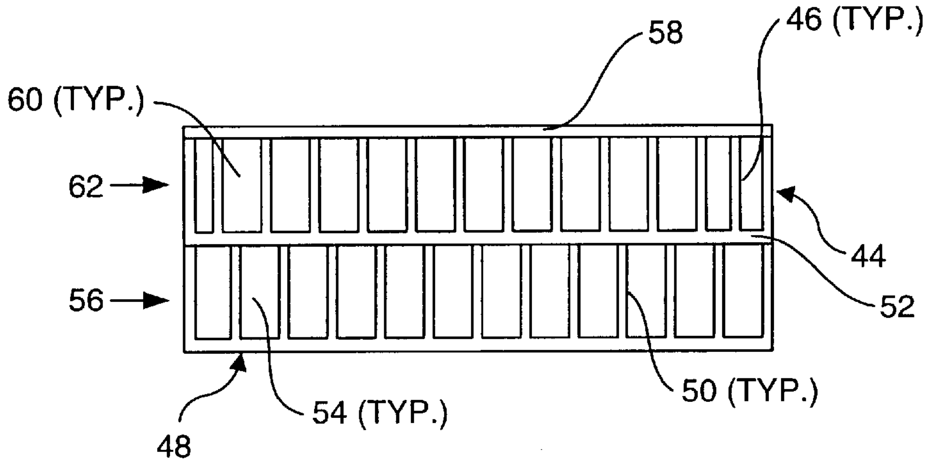
FIG. 4 is a cross-sectional view of a stacked counterflow heat exchanger comprising two of the heat exchanger plates shown in FIG. 2.

FIG. 4 shows a cross section of a counterflow heat exchanger assembly comprising a pair of the heat exchange plates stacked and sharing a common wall. A first heat exchange plate 44 with dividers 46 is disposed atop a second heat exchange plate 48, with dividers 50, and a bottom plate 52 of first heat exchange plate 44 acts as a cover for second heat exchange plate 48, thereby forming a plurality of enclosed flow paths 54 in a first layer 56. A cover plate 58 is disposed on top of dividers 46 to form another plurality of enclosed flow paths 60 in a second layer 62. This configuration of first layer 56 and second layer 62 serves as a counterflow heat exchanger if two different streams of air flow though each heat exchange plate in opposite directions, assuming that the heat exchange plates are fabricated of a material that conducts heat, such as aluminum. The plurality of dividers act as heat transfer fins, thereby aiding the vertical transfer of heat from the higher temperature air stream to the lower temperature air stream in this counter-flow heat exchanger.

As discussed above, the size of the pathways defined by the channels is very important. Preferably, the size of the pathways should be approximately 0.5–2 mm, falling within the mesochannel range discussed above. Experimental testing has shown that that mesochannel heat exchangers provide superior performance over conventional heat exchangers. Mesochannel heat exchangers have been shown to provide heat transfer rates in excess of 1000 $W/m^2K$, and efficiencies in excess of 90%. In contrast, conventional heat exchangers provide maximum efficiencies of approximately 70%. In addition to increased efficiencies, mesochannel heat exchangers require significantly less space and weight than convention heat exchangers.

Figure 5A:
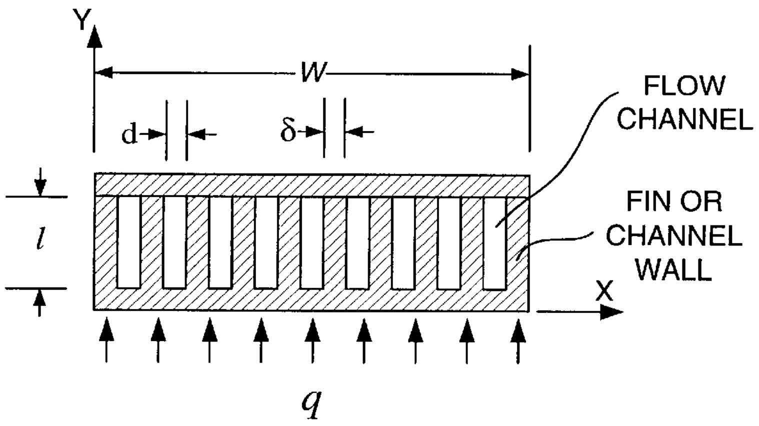
FIG. 5A is a diagram showing a plurality of flow channels in a mesochannel heat exchanger and corresponding parameters used for modeling heat transfer.

FIG. 5 shows a cross section of a parallel rectangular-shaped channel heat exchanger array that is modeled using the following analysis. Based on laminar flow assumptions, it can be shown that the heat transfer coefficient, h, and friction factor, f, scale in the following manner:

$$h\ k_f/d_h \tag{1}$$

$$f\ l/R_e \tag{2}$$

In Equations (1) and (2), $k_f$ is the thermal conductivity of the fluid, $d_h$ is the hydraulic diameter of the channels, and $R_e$ is the Reynolds number. Taking into account the greater surface areas, additional heat transfer enhancement is realized by reducing the fin thickness. At the limit when the fin thickness is much smaller than the width of the channels, the amount of enhancement is on the order of $(l/d)^2$. (It is assumed that l/d is large and the fin efficiency is close to 100%.) As a practical limitation, the pressure gradient grows faster than the heat transfer enhancement, thereby restricting the channel lengths that can be used.

To be complete, the upper wall of the channels is shown in the Figure. Although this may not contribute to improving the heat transfer coefficient in many instances, it can be shown that a closed-channel geometry is preferred over an open-channel geometry for certain applications, such as air cooling electronic devices. The open-fin geometry can result in choking the flow within the channel passages, and, in fact, may yield a lower heat transfer coefficient than would be realized with a plain surface without fins. For example, condensation over integral fin surfaces often suffer from liquid hold-up in between the fins, degrading the condenser performance, and defeating the purpose of using extended surfaces. Under these conditions, the closed-channel geometry is preferable.

The effectiveness (i.e., efficiency) of the heat exchanger when used in a counterflow heat exchange configuration can be determined as a function of the plate geometry by using the first law of thermodynamics and a correlation for the Nusselt number, as follows, $$\epsilon=[1+0.26(l/d_h)^{-2/3}Re_d^{1/2}]^{-1} \tag{3}$$

where l is the height of each channel, $d_h$ is the hydraulic diameter, and $Re_d$ is the Reynolds number corresponding to the hydraulic diameter, which is defined by:

$$Re_d=\left(\frac{\dot{m}}{A_c\mu}\right)d_h \tag{4}$$

where m is the total mass flow rate (given and constant), $A_c$ is the cross-sectional area of all the channels (given and constant), and $\mu$ is the dynamic or absolute viscosity of the fluid (e.g. air). For any given mass flow rate and any given fluid, it becomes clear that the heat exchanger efficiency increases as the channels become smaller, and reaches unity as the hydraulic diameter approaches zero. Unfortunately, the pressure drop (i.e., change in fluid pressure as the fluid traverses the length of the channel) grows very rapidly as the cross section of the channel is decreased. Thus, the heat exchanger designer must consider the tradeoff between increased efficiency and its corresponding pressure drop penalty.

Figure 5B:
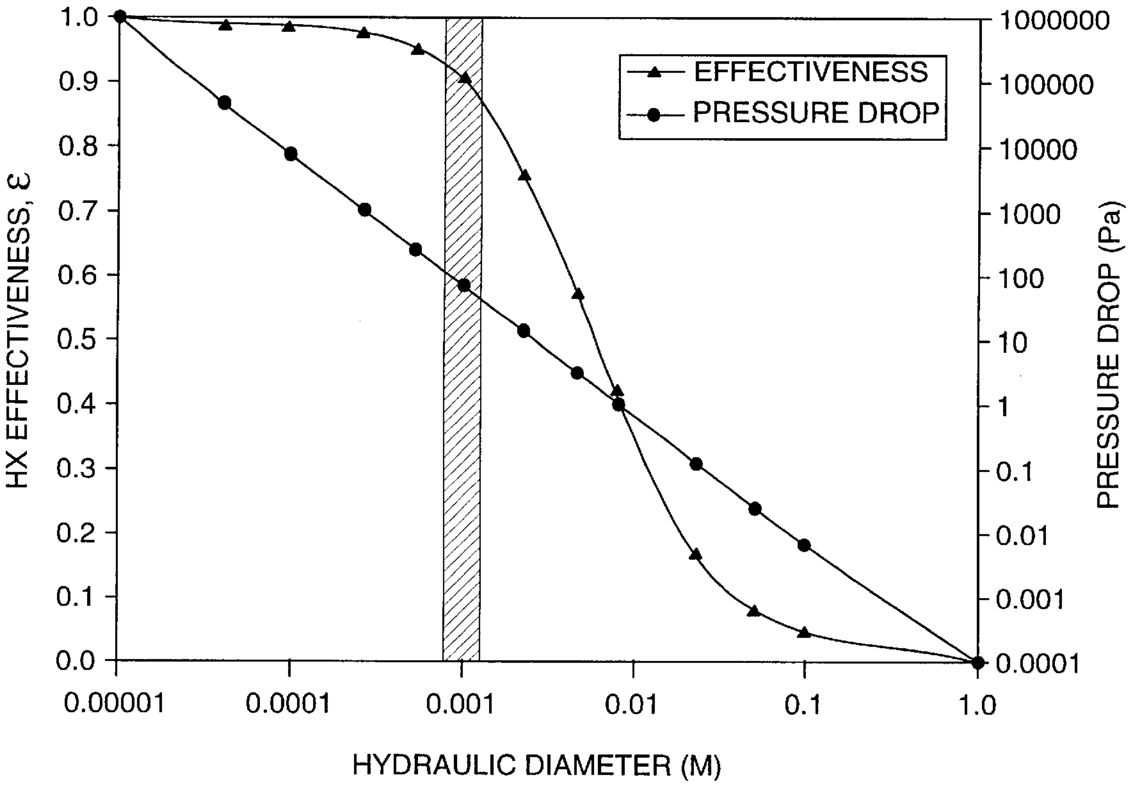
FIG. 5B is a graph showing heat transfer effectiveness and pressure drop vs. hydraulic diameter, which is used for determining an optimal size of the channels in the mesochannel heat exchanger.

FIG. 5B graphically illustrates effectiveness and pressure drop curves corresponding to a specific air-air heat exchanger application where the mass flow rate of the air is maintained at 1 g/s on both sides of the dividers and the length of the channels is fixed at 10 cm. As indicated by the shaded area, the optimum hydraulic diameter (i.e., channel width) when considering both effectiveness and pressure drop effects is approximately centered-about 1 mm. In this region, the slope of the pressure drop curve is significantly steeper than the slope of the effectiveness curve. As a result, a small improvement in effectiveness will require a substantial increase in the pressure drop. For example if the channel size is reduced from 1 mm to 100 microns, the pressure drop will increase by two orders of magnitude, while the heat exchanger effectiveness will only increase by 8%.

It will be understood by those skilled in the heat exchanger art that the performance of a specific heat exchanger configuration will depend on the particular fluid being used and other parameters, including mass flow rates, temperatures, materials used, etc. In addition, the optimum channel size for a particular application may deviate slightly from the foregoing analysis when considering additional effects, including axial heat conduction losses, material surface roughness, non-laminar flow conditions, etc.

Portable Air Purification Apparatus

Figure 6:
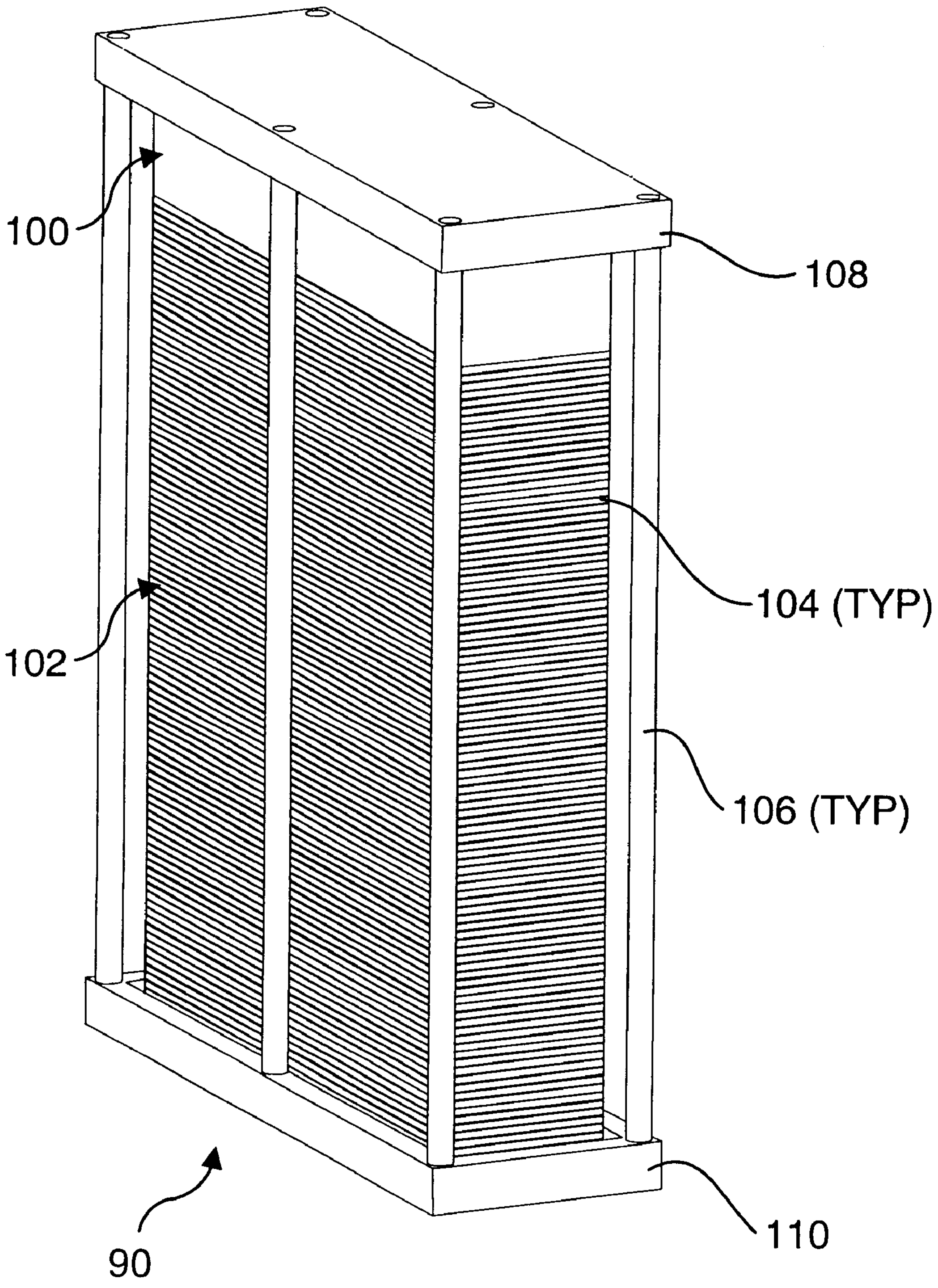
FIG. 6 is an isometric view of a first exemplary portable air purification apparatus in accord with the present invention.

An first exemplary embodiment of the present invention intended to function as a portable air purification apparatus 90 suitable for military field use and other uses is shown in FIG. 6. The apparatus comprises a high-temperature reaction chamber 100 disposed atop a counterflow heat exchanger 102 comprising a plurality of heat exchange plates 104. The reaction chamber and heat exchange plates are held together in a stacked configuration by a plurality of tie-rods 106, which connect an upper end plate 108 to a lower end plate 110, maintaining the plurality of heat exchange plates in a compressed, stacked array.

Figure 7:
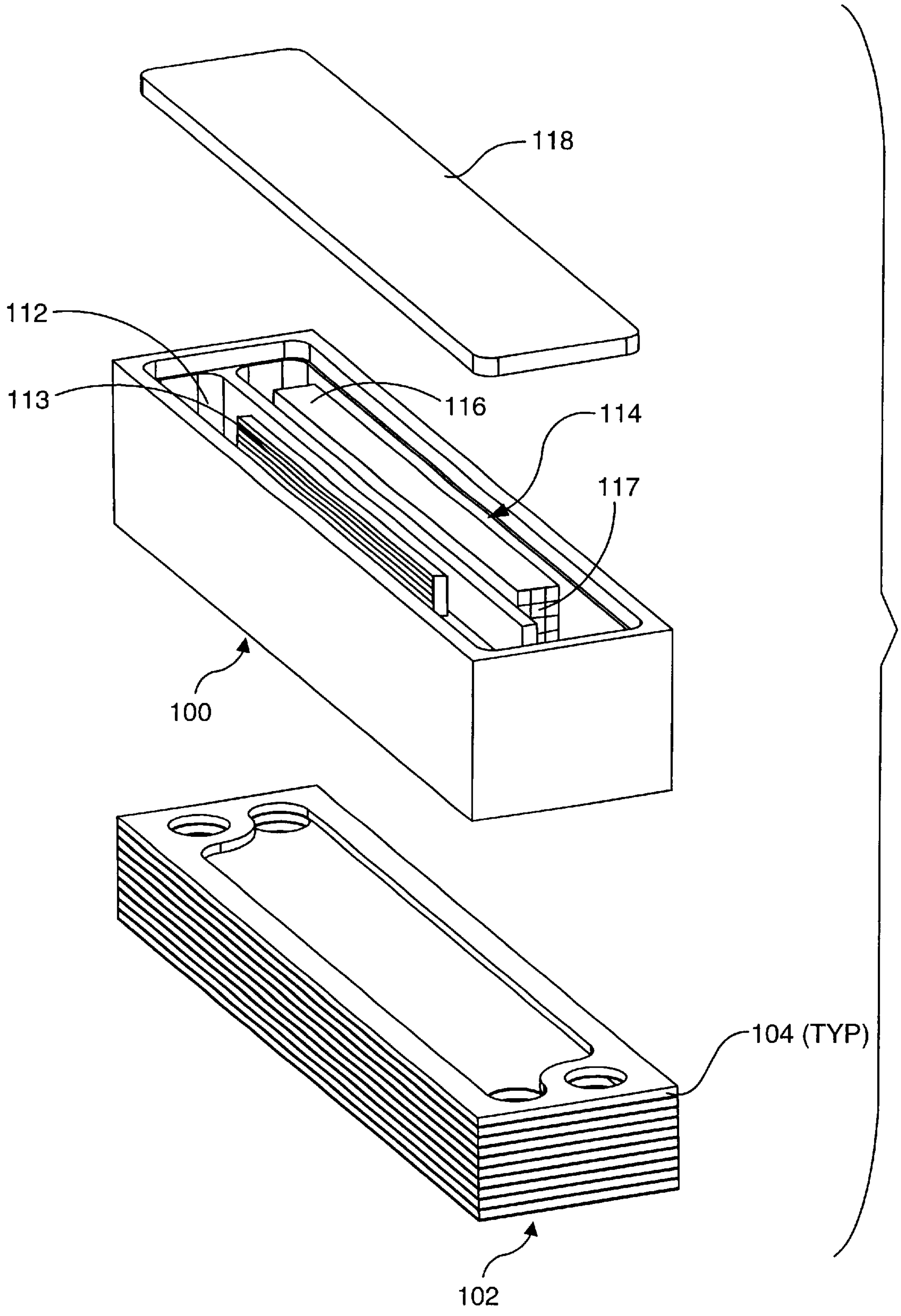
FIG. 7 is a partially exploded isometric view of a catalytic reactor and a portion of the heat exchanger plates used in the embodiment of FIG. 6.
Figure 8:
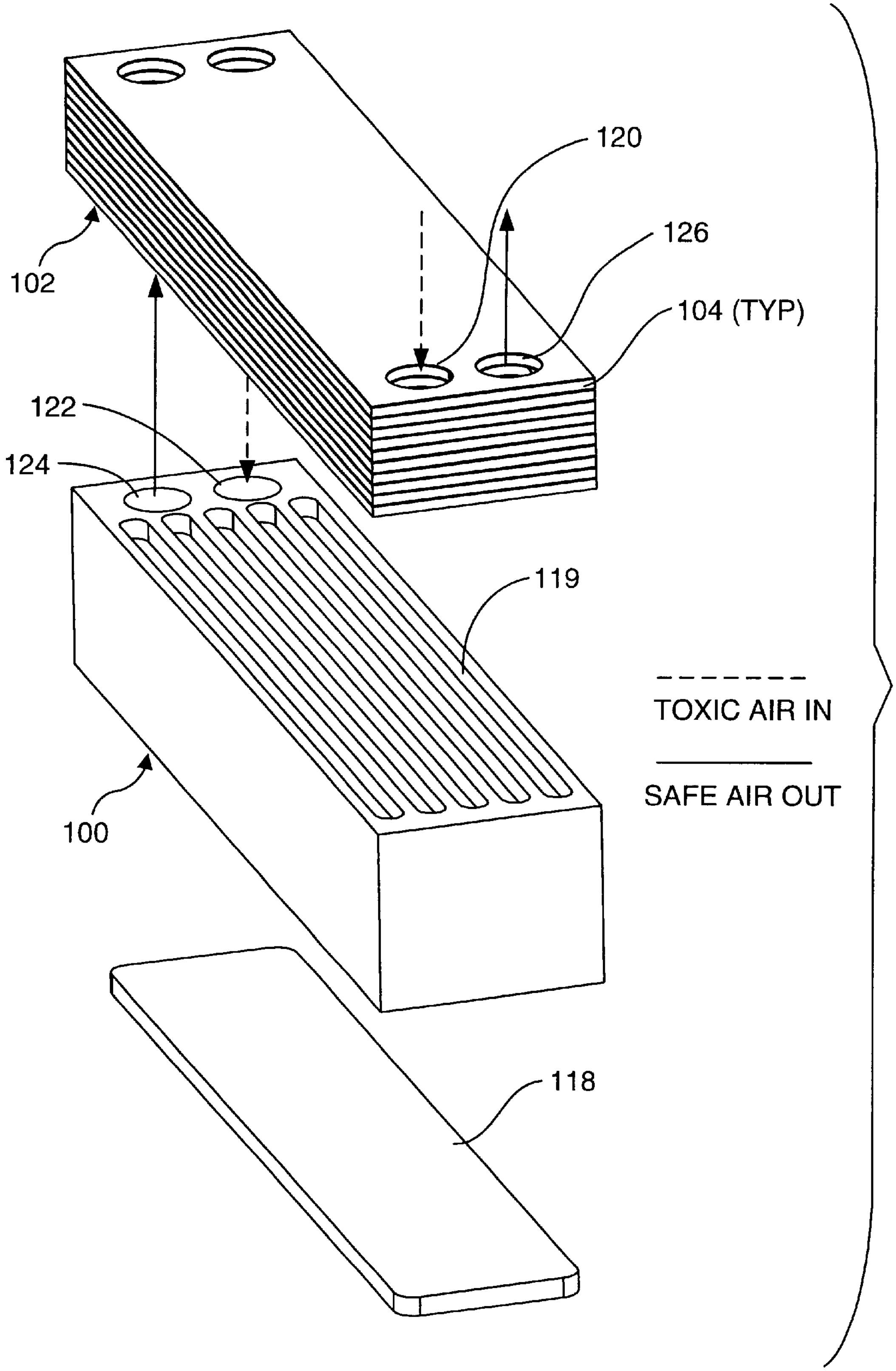
FIG. 8 is a partially exploded isometric view of the underside of the catalytic reactor and a portion of the heat exchanger plates used in the embodiment of FIG. 6.

FIGS. 7 and 8 respectively show top and bottom views of portions of portable air purification apparatus 90. Reaction chamber 100 comprises a combustion section 112, which preferably includes a heating element 113 (such as a resistance heater or light-hydrocarbon burner), and a reactor section 114, preferably including a catalyst element 116 comprising a plurality of catalyst-coated flow channels 117 through which heated air is circulated. The catalyst element may alternatively comprise an open cell ceramic foam coated with a noble metal catalyst. Suitable catalyst elements are available from the Allied Signal Corporation. The topside of the reaction chamber is covered by a plate 118. Heat exchange plates 104 comprising counterflow heat exchanger 102 are arranged in alternating relationship. As shown in FIG. 8, the top portion (relative to the drawing), which is actually just below reaction chamber 100 (as shown in FIG. 6), comprises a plurality of slots 119, which are used to insulate the catalytic reactor from the counterflow heat exchanger. The slots may be filled with air, or with a more efficient thermal insulating material such as aerogel.

Portable air purification apparatus 90 operates as follows. Air contaminated with toxic species is drawn in through an inlet port 120 defined in the underside of the heat exchanger. The air traverses the passages through every other plate of the stack from end to end, receiving heat from the adjacent plates that are not traversed. After the air has passed completely through the inlet or heating side of the heat exchanger, it enters combustion section 112 of reaction chamber 100 through an inlet port 122, where it is further heated by the heating element to a temperature sufficient to thermocatalytically deactivate the toxic species present in the air when the air passes through the catalytic reactor section. The air then passes through reactor section 114, which catalytically deactivates the toxic species contained therein, and thus purified, leaves the reactor section through an outlet port 124. From port 124, the air passes through the alternating plates in the heat exchanger that were previously not traversed, transferring heat to the air that has just entered the heat exchanger, and eventually exiting through an outlet port 126, at a temperature close to ambient. As the purified air is circulated through the outlet side of the heat exchanger, it transfers heat to the incoming air on the inlet or heating side of the heat exchanger. The air preferably is drawn through the apparatus by means of a fan or blower (not shown), which preferably has an inlet connected in fluid communication with outlet port 126.

Figure 9:
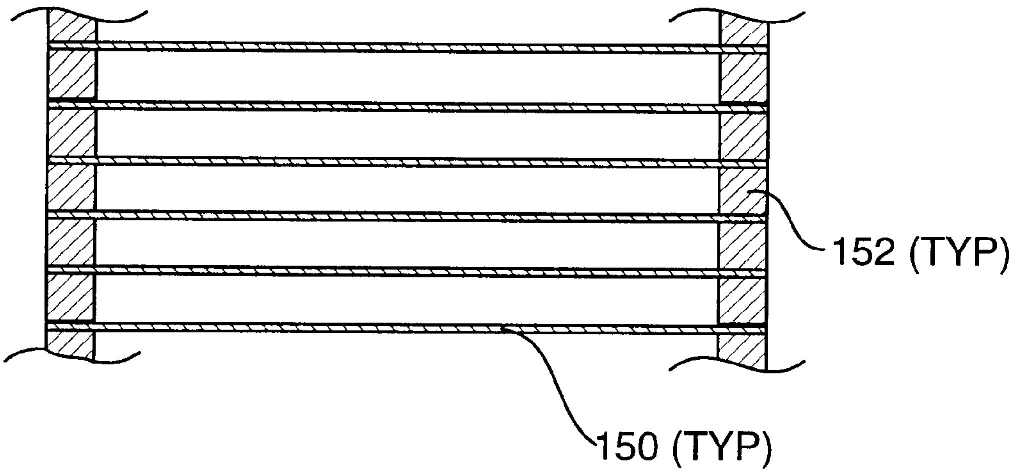
FIG. 9 is a cross-sectional view of a plurality of heat exchange plates and insulators comprising part of a mesochannel heat exchanger.

An optional configuration of the heat exchanger that reduces axial heat transfer losses is shown in FIGS. 9–10 and 11A–11C. With reference to FIG. 9, the heat exchanger comprises a plurality of thin metallic plates 150 separated by a plurality of insulators 152. The metallic plates preferably are 5–15 microns thick, and are made of a metal having a moderate thermal conductivity, such as aluminum or stainless steel. Preferably, the thermal conductivity of the insulator should be an order of magnitude less than the thermal conductivity of common insulators, such as fiberglass. Acceptable insulator materials include aerogels manufactured by the Nanopore Corporation, Albuquerque, N. Mex. In this instance, it will be necessary to provide a support structure for the aerogel, as aerogels are very fragile and easily fractured. A suitable support structure can be obtained by wrapping a thin metal sheet around a block of aerogel. In addition to aerogels, ceramics that exhibit low thermal conductivities may be used. In general, such ceramics will not require a separate support structure. The spacing between the plates preferably should range from 0.5–2.0 mm; the actual spacing will depend on the particular performance parameters the apparatus is designed to provide.

Figure 10:
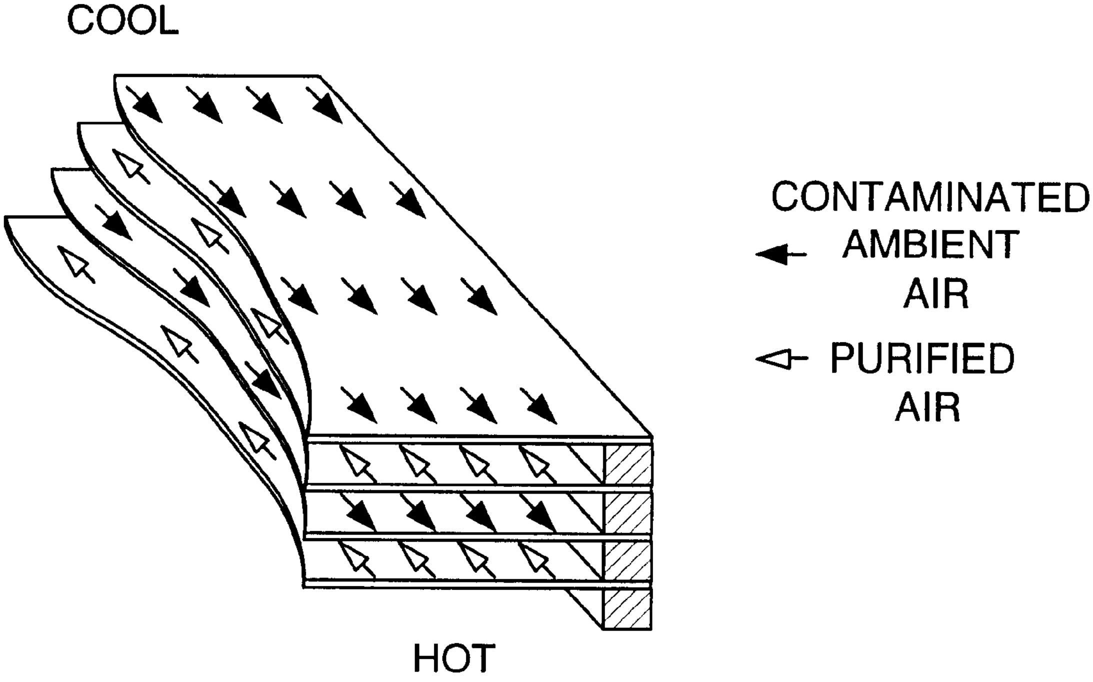
FIG. 10 is a cut-away view of plurality of heat exchanger channels illustrating the alternating direction of fluid flow within adjacent channels.
Figure 11A:
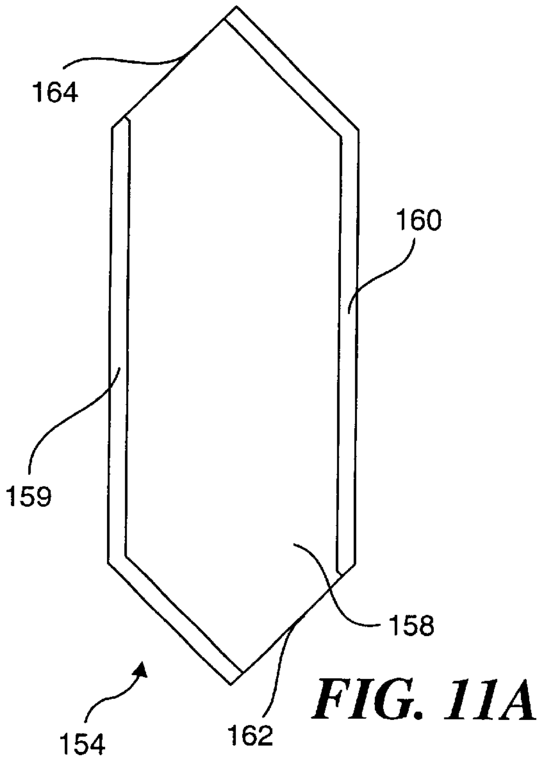
FIGS. 11A and 11B are plan views of exemplary heat exchange plates suitable for use in a counterflow heat exchanger comprising a plurality of the heat exchange plates stacked in an alternating fashion.
Figure 11B:
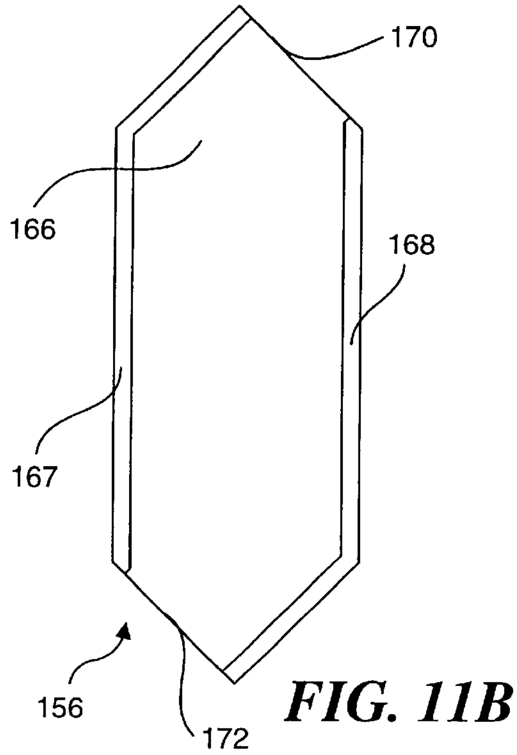
Figure 11C:
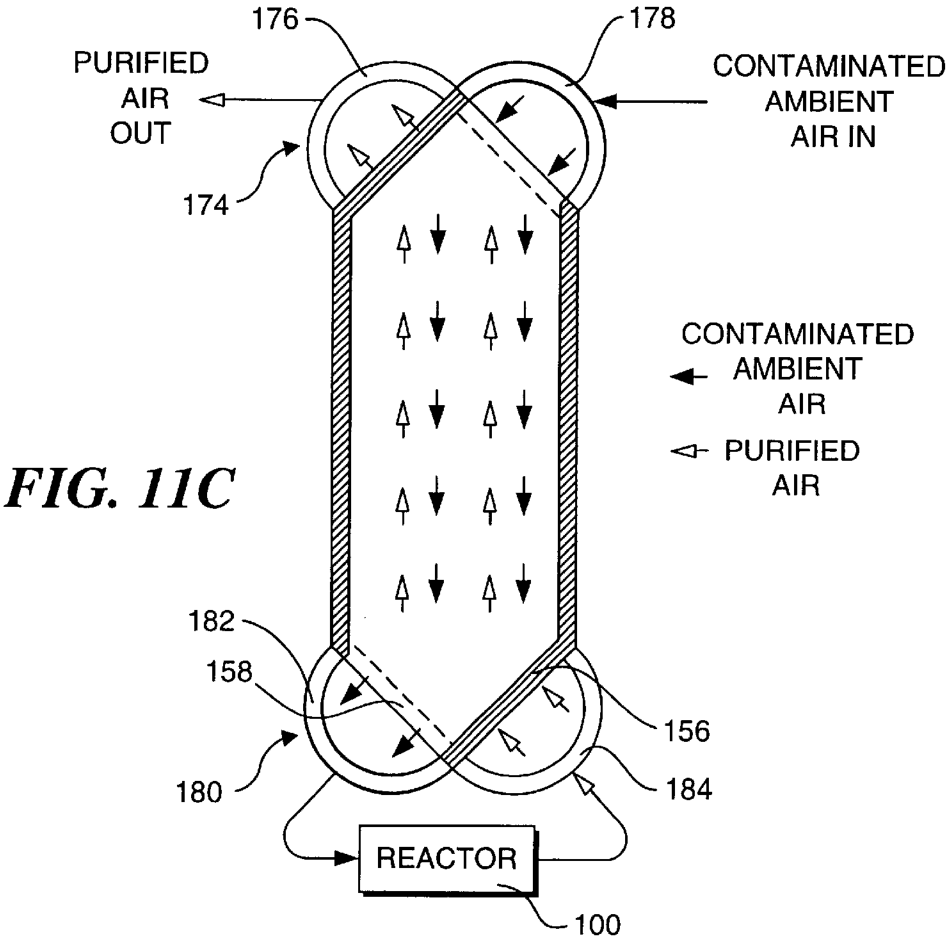
FIG. 11C is a plan view of an exemplary counterflow heat exchanger comprising a plurality of the heat exchange plates shown in FIGS. 11A and 11B.

In order to reduce heat transfer losses and increase efficiency, the heat exchanger should include a manifold configuration that causes hot air exiting the reactor and cold air entering the reactor to flow in opposite directions in alternating passages, as shown in FIG. 10. One such manifold configuration is shown in FIG. 11C, which comprises a plurality of hot-side and cold-side heat exchange plates 154, 156, alternately arranged in a stacked configuration. As shown in FIG. 11A, hot-side heat exchange plate 154 comprises a flat metallic plate 158 on which insulators 159, 160 are disposed, wherein the shape of metallic plate 158 and insulators 159, 160 are configured to define an inlet 162 and an outlet 164. As shown in FIG. 11B, cold-side heat exchange plate 156 is a mirror image of the cold side heat exchange plate. It includes a metallic plate 166 and insulators 167 and 168, which are configured to define an inlet 170, and an outlet 172.

A cold-end manifold 174, comprising a shell 176 disposed adjacent to outlets 164 and a shell 178 disposed adjacent to inlets 170, causes an incoming stream of contaminated ambient air and an exiting stream of purified air to flow through the heat exchanger plates in the directions shown by the flowpath arrows in FIG. 11C. The cold-end manifold additionally comprises an inlet port (in shell 178) and an outlet port (in shell 176) (neither shown) for conveying the flow of the incoming and exiting air streams. A similarly-shaped hot-end manifold 180 is disposed at the opposite end of the heat exchanger, comprising a shell 182 disposed adjacent to outlets 172 and a shell 184 disposed adjacent to inlets 162. The hot-end manifold additionally comprises an outlet port (in shell 182) and an inlet port (in shell 184) (neither shown) for enabling the air to flow through reactor 100 and the heat exchanger, as shown by the flowpath arrows in the Figure.

In addition to the horizontally-disposed arrangement of the plates shown the Figures, the plates may also be configured vertically, or at any angle that facilitates adequate channel flow. Further examples of heat exchanger plate configurations are presented below.

A second exemplary portable air purification apparatus is shown in FIGS. 12A and 12B. In this configuration, a counterflow heat exchanger 202 is disposed adjacent to a thermal reactor 200. Heat exchanger 202 comprises a top plate 203, a bottom plate 204, side plates 205, 206, an end panel 208, and a front panel (removed in the Figure), all of which are preferably assembled using a plurality of fasteners (not shown) or other suitable assembly technique, such as brazing or welding. A plurality of slots 210 are defined in each of top plate 203 and bottom plate 204, and respective pairs of slots are adapted to receive a heat exchanger plate 212 comprising a thin metallic plate 150 spanning a pair of aerogel insulators 152. Upon assembly, heat exchanger 202 comprises a plurality mesochannels defined by a plurality of heat exchanger plates 212; these plates are removed in the Figure to better illustrate the airflow paths within the heat exchanger and thermal reactor.

As shown in FIG. 12C, contaminated air enters the heat exchanger through a plurality of slots 213 defined in end panel 208. The spacing of slots 213 is adapted so that incoming air is permitted to enter every other heat exchanger channel (hereinafter referred to as inlet channels). With reference to FIG. 12B, the contaminated air is drawn through the inlet channels toward the front of the heat exchanger until it reaches a manifold (not shown), which redirects the contaminated air to a preheated air inlet 214 by passing it through a pipe 216 and an elbow block 218. Although not shown in the Figure, a portion of the contaminated air is redirected through a similar pipe, and through an elbow block 218' (FIG. 12C) disposed on an opposing side of thermal reactor 200. As the contaminated air flows forward through the inlet channels, it is heated by hot deactivated air entering a plurality of reaction channels 220 defined in thermal reactor 200, thereby preheating the air to a temperature that is slightly less than the temperature in the reaction channels. The walls of reaction channels 220 preferably comprise a capture surface comprising a catalyst that causes a thermocatalytic reaction to occur when the hot contaminated air is passed over it, thereby deactivating a substantial portion of any toxic organic chemical and biological species present in the air. Alternately, one or more catalytic elements may be disposed within reaction channels 220 to cause the thermocatalytic reaction, as described above.

As the thermocatalytically deactivated air exits reaction channels 220, it is redirected by a manifold (not shown) toward the rear of heat exchanger 202, and through outlet channels adjacent to the inlet channels in which the incoming contaminated air flows. This arrangement enables heat to be transferred from the exiting hot deactivated air to the incoming cool contaminated air, thereby substantially cooling the deactivated air prior to it exiting as clean breathable air through an exhaust port 222 defined toward the back end of top plate 203.

The thermal reactor is heated by an external heat source, such as a gas-fired flame (e.g., butane), or an internal heat source, such as an electric resistance heater (neither shown). According to a first preferred configuration, the preheated air is further heated as it passes through a gas-fired combustor 219 located toward the rear of the apparatus. In such a combustor, the hot exhaust gases produced by combustion of the gas are separated from the preheated air by a heat exchange plate (not shown), preferably comprising a plurality of fins. According to a second preferred configuration, a gas-fired combustor (not shown) may be disposed under thermal reactor 200, so that heat is transferred from the hot exhaust gases produced by combustion of the fuel to the thermal reactor through a plurality of fins 221 disposed on the underside of the thermal reactor.

Preferably, a gap 224 is defined between thermal reactor 200 and heat exchanger 202 to reduce heat transfer between the two components. Gap 224 may be an air gap, or may be filled with a suitable thermal insulator, preferably an aerogel. A fan disposed in a duct (neither shown) connected to exhaust port 222 is used to create a pressure differential that sequentially draws the air through the inlet channels of the heat exchanger, past the combustor (if applicable), through the thermal reactor, and from the outlet channels of the heat exchanger.

The portable apparatus may be used alone, or in combination with other such devices. For example, it is envisioned that multiple portable air purifiers like that described above could be connected together to purify air in military (or civilian) helicopters, tanks, vehicles, etc. The use of the catalyst element in the thermal reactor is optional, depending on the type of contaminant that is to be removed or deactivated. For instance, an air purification apparatus substantially like that discussed above, but without the catalyst element, is well suited for use in a refrigerator, where it could be used to deactivate bacteria such as salmonella. Furthermore, multiple devices of this type, or scaled-up devices could be used in food-processing plants, or in any other building requiring purified air. The configuration of the counterflow heat exchanger may also be altered and its size substantially reduced. For example, the configuration of the heat exchanger may be modified so that an air purification apparatus similar in operation to that discussed above can be incorporated into a gas mask canister (not shown).

Scavenger Embodiments

In addition to the portable apparatus described above, the principles of the invention can be applied to larger devices, known as scavengers, which purify larger volumes of air. A cut-away view of a first exemplary scavenger embodiment 250 is shown in FIGS. 13A and 13B. Scavenger 250 comprises a cylindrical base 252 connected to a cylindrical shell 256, which in turn is connected to a crested cover 258. A plurality of vertical slots 260 configured in a polar array are defined in the cylindrical shell to allow incoming contaminated air to enter a plurality of inlet channels defined in a counterflow heat exchanger 262 disposed within an upper portion of the scavenger. Counterflow heat exchanger 262 comprises an array of radially extending heat exchange plates 264, which are disposed in an annular volume defined by cylindrical shell 256, crested cover 258, an internal cylinder 266 (radially inset from the cylindrical shell), and an annular manifold plate 268. Heat exchanger plates 264 preferably are separated by a plurality of insulators, which preferably comprise an aerogel (not shown).

With reference to FIG. 13B, as contaminated air is drawn into slots 260, it flows inwardly across the plurality of inlet channels until it enters a reaction chamber 270, comprising an annular volume defined by internal cylinder 266, crested cover 258, and a bottom plate 272. Note that the height of the inlet channels progressively increases as the contaminated air moves toward reaction chamber 270, thereby permitting thermal expansion of the air and reducing the pressure drop across the channels. As the contaminated air moves through the inlet channels, it is preheated by a heat exchange with deactivated air that has exited reaction chamber 270 and is flowing through adjacent outlet channels (i.e., through every other channel that is not an inlet channel) in an opposite (radially outward) direction relative to the incoming contaminated air. The preheated contaminated air enters reaction chamber 270, which is maintained at a sufficient temperature to thermally deactivate target toxic chemical and/or biological species present in the air. As with the foregoing thermal reactors and reaction chambers, reaction chamber 270 may include channels comprising a catalyst capture surface, or have one or more catalytic elements disposed therein, depending on the types of contaminants that are to be removed or deactivated. In either of these instances, toxins in the air are thermocatalytically deactivated, in addition to being thermally deactivated. The thermally and/or thermocatalytically deactivated (as appropriate) air exits reaction chamber 270, whereupon it flows radially outward through the outlet channels, thereby being cooled by the heat exchange with the incoming air. The cooled deactivated air is then drawn down into an annular region 274 defined beneath manifold plate 268 through a plurality of radially-extending slots 276 defined in an outer portion of the manifold plate. The cooled deactivated air is then drawn inwardly into a blower 278 that is centrally-disposed in base 252. The cooled deactivated air, which is now at a temperature suitable for breathing, is finally pushed out of the scavenger through a plurality of exhaust ports 280 defined in base 252.

Reaction chamber 270 is preferably heated by a gas-fired heat source, or (an) electric resistance heater element(s) (Both not shown). For example, a gas-fired combustor could be disposed in the center of the reaction chamber. In addition, the internal surfaces (except for any capture surface areas) of reaction chamber 270 preferably should be lined with an insulator (not shown), such as an aerogel or a ceramic.

A cut-away view of a second exemplary scavenger embodiment 300 is shown in FIG. 14. Scavenger 300 comprises a generally cylindrical-shaped shell comprising a base 301, connected to a cylindrical shell 302, which in turn is connected to a cover 303 in which a plurality of radially-extending slots 304 are defined. Slots 304 arc configured to allow contaminated air to enter a plurality of inlet channels defined in a counterflow heat exchanger 305 disposed in an upper portion of the scavenger. The counterflow heat exchanger comprises an array of heat exchange plates 306, which are disposed in an annular volume defined by cylindrical shell 302, cover 303, an internal cylinder 307, and lower edges 308 of heat exchange plates 306. Heat exchange plates 306 preferably are separated by a plurality of insulators, which preferably comprise an aerogel (not shown). Slots 304 and heat exchange plates 306 are configured such that every other channel defined by an adjacent pair of heat exchange plates comprises an inlet channel, while each of the remaining alternating channels comprises an outlet channel.

As contaminated air is drawn down the plurality of inlet channels, it is preheated by purified deactivated air flowing upward through the plurality of outlet channels, whereupon it enters a reaction chamber 310, comprising an annular volume defined by lower portions of cylindrical shell 302 and inner cylinder 307, and a annular base plate 311. As with the foregoing thermal reactors and reaction chambers, reaction chamber 310 may include channels comprising a catalyst capture surface, or have one or more catalytic elements disposed therein, depending on the types of contaminants that are to be removed. The contaminated air is thermally or thermocatalytically deactivated (as appropriate) in reaction chamber 310, whereupon it exits the reactor by flowing upward through the plurality of outlet channels, thereby becoming cooled by a heat exchange with the incoming air. The cooled deactivated air is then drawn through a plurality of slots 313 defined toward the top of inner cylinder 307, whereupon it is moved downward within the inner cylinder toward a blower 312, which is centrally disposed in base 301. The cooled deactivated air is then pushed out of the scavenger through a plurality of exhaust ports 314 defined in base 301.

Reaction chamber 310 is preferably heated by a fuel-fired heat source, or an electric resistance heater (neither shown). In addition, the internal surfaces (except for any capture surface areas) of reaction chamber 310 preferably are lined with an insulator, such as an aerogel, or a ceramic. For example, a thin disk 315 comprising an aerogel or ceramic is preferably disposed above base plate 311.

A cut-away view of a third exemplary scavenger 320 comprising a rectangular external geometry is shown in FIG. 15. The scavenger comprises a generally cube-shaped housing comprising a front panel 322, a back panel 324, a top panel 326, a base plate 328, and side panels 329 and 330. A first set of inlet ports 332 are defined in a front upper corner portion of the housing where front panel 322 meets top panel 326. Likewise, a second set of inlet ports 333 are defined in backside upper corner portion of the housing where back panel 324 meets top panel 326. A frontside counterflow heat exchanger 334 comprising a first set of vertically disposed heat exchange plates 335 is disposed adjacent to front panel 322. In addition, a similar backside counterflow heat exchanger 336 comprising a second set of vertically disposed heat exchange plates 337 is disposed adjacent to back panel 324. Each of the heat exchange plates comprising the frontside and backside counterflow heat exchangers preferably are separated by aerogel insulators (not shown). In addition to air inlets 332 and 333, respective sets of air outlets 338 and 339 are also defined in top panel 326, wherein each outlet port is offset by one channel from a longitudinally adjacent inlet port. The respective inlet ports, outlet ports, and heat exchange plates in each of the frontside and backside counterflow heat exchangers are configured such that every other channel defined by the heat exchange plates comprises an inlet channel, while the remaining channels comprise outlet channels. Furthermore, the heat exchanger channels preferably are defined such that the width of the channels progressively increase toward the reaction chamber.

As contaminated air enters inlet ports 332 and 333, it is drawn down the plurality of inlet channels toward a reaction chamber 340 disposed below bottom edges 342 and 343 of respective heat exchange plates 335 and 337. The air is preheated by heat transfer with hot deactivated air flowing in an opposite (upward) direction through adjacent outlet channels. Reaction chamber 340 is preferably heated by gas-fired combustion or with one or more electric resistance heaters to thermally or thermocatalytically (depending on whether a catalyst is present) deactivate toxins in the air. The deactivated air exits the reactor and flows upward through the plurality of outlet channels and is cooled by the heat transferred to the incoming air. The cooled deactivated air is then drawn through outlet ports 338 and 339 into a plenum 344, at the top of which a blower 346 is disposed. The purified air is then forced out by the blower through a plurality of slotted exhaust ports 348 defined in an upper portion of plenum 344.

Although it is preferable that scavenger 320 include both the front and back counterflow heat exchangers, an alternative configuration of the scavenger (not shown) may comprises only a single counterflow heat exchanger.

The process and apparatus embodiments of the invention can be used to reduce the amount of toxic organic and biological contaminants in the air that has been purified with the present invention, by at least 90%. Depending on the type of contaminant, the amount of time the air is in contact with the catalyst, the recirculation of air through air purification apparatus 90 or through a plurality of such devices coupled in series, the level of contaminants may be more preferably reduced by 99%, or most preferably by 99.99%.

Experimental Results

The portable air purification apparatus has been shown to be very effective in removing and deactivating toxic species in air during laboratory testing. For example, a test has been conducted to demonstrate the efficacy of the apparatus in removing or deactivating simulated anthrax spores from air. In this test, the apparatus was used to purify air contaminated with aerosol of *Bacillus globigii* (BG) spores. These spores simulate the spores of *Bacillus anthracis,* which is commonly known as anthrax. Using a typical breathing air flow rate of 20 liters per minute and a wide range of BG concentrations from 5 to 5100 cfu/l, (colony forming units per liter) more than 99.9% of the BG was deactivated by air purification apparatus 90.

In parallel with the BG tests, another portable air purification apparatus 90 was tested at the U.S. Army Soldier and Biological Chemical Command (SBCCOM) (an Army laboratory specializing in nerve agents) to determine its efficacy in purifying air contaminated with dimethylmethylphosphonate (DMMP), which is a well-known nerve agent simulant. Reactor section 114 of the air purifier was fitted with a catalyst element supplied by the Allied Signal Corporation, which has been specially developed for thermocatalytically deactivating nerve agents. The SBCCOM tests indicated that from about 99.5% of the DMMP was deactivated (by conversion to other non-toxic compounds), depending on the DMMP concentration and flow rate. It is clear that the thermocatalytic reactor was very effective in deactivating DMMP to purify air contaminated with it. The SBCCOM test results provide solid evidence that thermocatalytic destruction of a nerve agent in an air purifying apparatus like that discussed above is a viable approach for use in a gas mask canister.

Although the foregoing preferred embodiments of the invention have been described in the context of purifying air, these embodiments are also suitable for purifying a breathable gas, or other gases.

Although the present invention has been described in connection with the preferred forms of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. Apparatus for purifying a gas contaminated with toxic species, comprising:

(a) a thermal reactor having an inlet port, an outlet port, and a fluid path connecting the inlet point in fluid communication with the outlet port;

(b) a heat source for heating the gas contaminated with the toxic species passing through the thermal reactor to a temperature sufficient to thermally deactivate at least 90% of any toxic biological species contaminating the gas, producing a purified gas;

(c) a counterflow heat exchanger comprising a first passage and a second passage, said first passage and said second passage being disposed adjacent each other in heat exchange relationship, the first passage having an inlet port for receiving the gas that is contaminated, and an outlet port in fluid communication with the inlet port of the thermal reactor, the second passage having an inlet port in fluid communication with the outlet port of the thermal reactor, and an outlet port for exhausting the purified gas from the thermal reactor that has been cooled by passing through the counterflow heat exchanger, the gas that is contaminated flowing through the first passage within the counterflow heat exchanger in a direction opposite that of the purified gas flowing in the second passage so that heat is transferred from the purified gas flowing through the second passage to the gas that is contaminated flowing in the first passage to preheat the gas that is contaminated and to cool the purified gas; said counterflow heat exchanger having a thermal efficiency of at least 90%; and (d) a blower that circulates the gas through the thermal reactor and the first and second passages of the counterflow heat exchanger.

2. The apparatus of claim 1, wherein the gas comprises air.

3. The apparatus of claim 1, wherein the toxic species have a size less than 10 $\mu$m and a concentration in the gas that is contaminated of less than 50,000 parts per million.

4. The apparatus of claim 1, wherein the heat source comprises a burner that burns a light hydrocarbon as a fuel.

5. The apparatus of claim 4, wherein the light hydrocarbon is one of butane, natural gas, and propane.

6. The apparatus of claim 1, wherein the heat source comprises an electrical resistance heater.

7. The apparatus of claim 1, wherein the gas that is contaminated enters the inlet port of the first passage through the counterflow heat exchanger at a temperature less than 45° C., and the purified gas is exhausted from the outlet port of the second passage through the counterflow heat exchanger at a temperature less than 50° C.

8. The apparatus of claim 1, wherein the fluid path in the thermal reactor includes a capture surface comprising a porous material over and/or through which the gas is circulated, said toxic biological species being captured by the capture surface for a sufficient time to thermally deactivate at least 90% of the toxic biological species in the gas.

9. The apparatus of claim 8, wherein the capture surface comprises a catalyst, whereby a thermocatalytic reaction is caused to occur when the gas is circulated past the capture surface, said thermocatalytic reaction deactivating at least 90% of any toxic organic species in the gas, thereby forming less toxic organic species in the purified gas.

10. The apparatus of claim 9, wherein the capture surface comprises at least one of the following:

(a) a wire mesh formed of a noble metal;

(b) a wire mesh coated with a noble metal;

(c) a ceramic fiber mesh;

(d) a ceramic fiber mesh coated with a noble metal;

(e) a bed of porous ceramic pellets coated with a noble metal;

(f) a flow channel coated with a thin film of one of a porous ceramic and a metal, said one of the porous ceramic and the metal being coated with a noble metal;

(g) a porous metal foam coated with a thin film of porous ceramic; and (h) a porous metal foam coated with a noble metal.

11. The apparatus of claim 10, wherein the noble metal comprises at least one of platinum and palladium.

12. The apparatus of claim 1, wherein the temperature in the fluid path of the thermal reactor is at least 200° C.

13. The apparatus of claim 1, wherein the temperature in the fluid path of the thermal reactor is at least 300° C.

14. The apparatus of claim 1, wherein the thermal reactor comprises:

(a) an enclosure comprising a bottom, two side portions having top edges, and two end portions having top edges, and an inlet port disposed in one side portion and an outlet port disposed in the other side portion;

(b) a plurality of substantially parallel dividers, each divider having opposed ends and a base connected to the bottom and oriented generally perpendicular to the bottom, the plurality of dividers extending across a majority of the bottom with the ends of the dividers being spaced apart from the two side portions producing a gap between each end of the dividers and the side portions so has to form a channel along and adjacent to an inner surface of each side portion, the plurality of dividers including a noble metal coating over at least a portion of their surface; and (c) a cover fitted over the enclosure base and sealed to the top edges of the side portions and end portions of the enclosure.

15. The apparatus of claim 1, wherein each of the first passages and the second passages in the counterflow heat exchanger comprise a plurality of channels having a hydraulic diameter of 0.5–2.0 millimeters.

16. The apparatus of claim 15, wherein the plurality of channels are defined by a plurality of thin-walled, spaced-apart heat exchange plates, each having a thickness of less than 15 microns and being separated from an adjacent heat exchange plate by a distance of 0.5–2.0 millimeters, and wherein the first passage and the second passage comprise alternating channels.

17. The apparatus of claim 16, wherein each of the plurality of heat exchange plates is separated from an adjacent heat exchange plate by a pair of insulators disposed along the edges of and between the heat exchange plates.

18. The apparatus of claim 17, wherein the insulators comprise an aerogel.

19. The apparatus of claim 1, wherein the toxic species comprise at least one of: Sarin, bis(2-chloroethyl)thioether, phosgene, cyanogen chloride, ammonia, ethylene oxide, anthrax, *E. coli,* salmonella, hepatitis, listeria, legionella, and Norwalk virus.

20. A portable air purification apparatus for purifying contaminated air, comprising:

(a) a reaction chamber having an inlet port and an outlet port and comprising an internal volume in which air contaminated with toxic species is heated to a temperature of at least 200° C. to thermally deactivate a substantial portion of any toxic biological species present in the contaminated air, thereby producing thermally purified air;

(b) a heat source for heating the reaction chamber;

(c) a counterflow heat exchanger comprising a first passage and a second passage, said first passage, and said second passage being disposed adjacent each other in heat exchange relationship, the first passage having an inlet port for receiving the contaminated air, and an outlet port in fluid communication with the inlet port of the reaction chamber, the second passage having an inlet port in fluid communication with the outlet port of the reaction chamber, and an outlet port for exhausting thermally purified air from the reaction chamber that has been cooled by passing through the counterflow heat exchanger, the contaminated air flowing through the first passage within the counterflow heat exchanger in a direction opposite that of the thermally purified air flowing in the second passage so that heat is transferred from the thermally purified air flowing through the second passage to the contaminated air flowing in the first passage to preheat the contaminated air and to cool the thermally purified air, the heat source further heating the contaminated air flowing through the enclosed passage; said first passage and said second passage being mesoscale in dimension; and (d) a blower in fluid communication with one of the first and the second passages, said blower causing air to flow through the counterflow heat exchanger and reaction chamber.

21. The portable air purification apparatus of claim 20, wherein the counterflow heat exchanger comprises a plurality of heat exchange plates arranged in a stack, adjacent pairs of the heat exchange plates defining a pathway coupling an inlet port in fluid communication with an outlet port, said pathways being arranged in an alternating fashion such that the first passage comprises every other pathway in the stack, and the second passage comprises remaining pathways of the stack.

22. The portable air purification apparatus of claim 21, wherein the pathways each have a cross-sectional height of less than 1.5 mm.

23. The portable air purification apparatus of claim 21, wherein each of the plurality of heat exchange plates is separated from an adjacent plate by an insulating material disposed along edges of the heat exchange plates.

24. The portable air purification apparatus of claim 23, wherein the insulating material comprises an aerogel.

25. The portable air purification apparatus of claim 20, wherein the heat source comprises an electrical resistance heater.

26. The portable air purification apparatus of claim 20, wherein the heat source comprises a burner that burns a light-hydrocarbon fuel.

27. The portable air purification apparatus of claim 20, wherein the reaction chamber includes a capture surface comprising a porous material over and/or through which the air is circulated, said toxic biological species being captured by the capture surface for a sufficient time to thermally deactivate at least 90% of the toxic biological species in the air.

28. The portable air purification apparatus of claim 27, wherein the capture surface comprises a catalyst, whereby said contaminated air, when exposed to said capture surface, experiences a thermocatalytic reaction that deactivates a substantial portion of any toxic chemical species present in the air.

29. The portable air purification apparatus of claim 20, wherein the reaction chamber and counterflow heat exchanger are configured and sized so as to adapt them for use in a gas mask for purifying contaminated air.

30. Apparatus for purifying air contaminated with toxic species, comprising:

(a) a generally cylindrical-shaped housing comprising a base connected to a cylindrical shell, which in turn is connected to a cover in which a plurality of inlet ports are disposed for receiving incoming contaminated air, said base having at least one exhaust port defined therein for exhausting purified air;

(b) a counterflow heat exchanger having a thermal efficiency in excess of 85%, said counterflow heat exchanger comprising:

(i) a first annular volume defined by the cylindrical shell, the cover, and an internal cylinder, said internal cylinder having a plurality of outlet ports; and (ii) an array of spaced-apart heat exchange plates disposed within the first annular volume, extending radially between the cylindrical shell and the internal cylinder, and extending from the cover toward an edge disposed generally adjacent to the base, a plurality of inlet channels and a plurality of outlet channels being respectively defined between adjacent heat exchange plates, said plurality of inlet channels alternating with said plurality of outlet channels, said plurality of inlet ports providing an inlet into each inlet channel, such that air flowing through the inlet channels flows in an opposite direction relative to that flowing through the outlet channels;

(c) a reaction chamber disposed in the base, receiving the contaminated air flowing from the inlet channels, producing the purified air that flows from the reaction chamber into the outlet channels, said reaction chamber comprising a second annular volume defined by a lower portion of the cylindrical shell, a lower portion of the internal cylinder, the edges of the plurality heat exchange plates, and an annular base plate extending between the cylindrical shell and the internal cylinder;

(d) a heat source for heating the reaction chamber to a temperature sufficient to purify the contaminated air by thermally deactivating at least 90% of any toxic biological species in the contaminated air when said air is circulated through the reaction chamber, thereby converting the toxic biological species into non-viable biological species; and (e) a blower that causes the contaminated air to flow into the inlet ports and through the inlet channels, thereby preheating the contaminated air by heat exchange with the purified air exiting the reaction chamber, said preheated contaminated air flowing into the reaction chamber through the inlet channels in a direction opposite that of the purified air flowing through the outlet channels, said purified air being cooled by heat exchange with the contaminated air and being exhausted through said at least one exhaust port.

31. The apparatus of claim 30, further comprising an insulating material disposed adjacent the annular plate so as to reduce heat transfer between the reaction chamber and the purified air flowing through said at least one exhaust port.

32. The apparatus of claim 30, wherein adjacent heat exchange plates are separated by an insulating material disposed along edges of said heat exchange plates.

33. The apparatus of claim 30, wherein the reaction chamber includes a capture surface comprising a porous material over and/or through which the air is circulated, said toxic biological species being captured by the capture surface for a sufficient time to be thermally deactivated.

34. The apparatus of claim 33, wherein the capture surface comprises a catalyst that causes a thermocatalytic reaction to occur when the contaminated air is circulated past the capture surface, said thermocatalytic reaction deactivating at least 90% of any toxic organic species in the contaminated air, thereby forming less toxic organic species.

35. Apparatus for purifying air contaminated with toxic species, comprising:

(a) a generally cylindrical housing having a cover disposed atop a cylindrical shell, sad cylindrical shell being connected to a base and including a plurality of inlet ports into which contaminated air flows, sad base having at least one exhaust port defined therein for exhausting purified air;

(b) a counterflow heat exchanger comprising:

(i) an annular volume defined by the cylindrical shell, the cover, an internal cylinder, and an annular manifold plate that extends between a lower portion of the cylindrical shell and a lower portion of the internal cylinder, said internal cylinder having a plurality of slots defined therein through which the contaminated air is received and the purified air is expelled, said annular manifold plate having a plurality of outlet ports defined therein; and (ii) an array of spaced-apart heat exchange plates disposed within the annular volume, extending radially between the internal cylinder and the cylindrical shell, and extending between the cover and the annular manifold plate, a plurality of inlet channels and a plurality of outlet channels being respectively defined between adjacent heat exchange plates, said plurality of inlet channels alternating with said plurality of outlet channels, said plurality of inlet ports providing an inlet into each inlet channel, such that the contaminated air flowing through the inlet channels flows in an opposite direction relative to that of the purified air flowing through the outlet channels; a spacing between adjacent spaced-apart plates being mesoscale in dimension;

(c) a reaction chamber comprising a cylindrical volume defined by the internal cylinder, the cover, and a circular bottom plate, said reaction chamber receiving the contaminated air flowing from the inlet channels through the plurality of slots, said purified air flowing from the reaction chamber into the outlet channels through the plurality of slots;

(d) a heat source for heating the reaction chamber to a temperature sufficient to purify the contaminated air by thermally deactivating at least 90% of any toxic biological species in the contaminated air when said air is circulated through the reaction chamber, thereby converting the toxic biological species into non-viable biological species; and (e) a blower that causes the contaminated air to flow into the inlet ports and through the inlet channels, thereby preheating the contaminated air by heat exchange with the purified air exiting the reaction chamber, said contaminated air that is preheated flowing into the reaction chamber through the inlet channels in a direction opposite that of the purified air flowing through the outlet channels, said purified air being cooled by heat exchange with the contaminated air and being exhausted through said at least one exhaust port.

36. The apparatus of claim 35, further comprising an insulating material disposed adjacent the circular bottom plate so as to reduce heat transfer between the reaction chamber and the purified air flowing through said at least one exhaust port.

37. The apparatus of claim 35, wherein adjacent heat exchange plates are separated by an insulating material disposed along edges of said heat exchange plates.

38. The apparatus of claim 35, wherein the reaction chamber includes a capture surface comprising a porous material over and/or through which the contaminated air is circulated, said toxic biological species being captured by the capture surface for a sufficient time to be thermally deactivated.

39. The apparatus of claim 38, wherein the capture surface comprises a catalyst that causes a thermocatalytic reaction to occur when the contaminated air is circulated past the capture surface, said thermocatalytic reaction deactivating at least 90% of any toxic organic species in the contaminated air, thereby forming less toxic organic species.

40. The apparatus of claim 35, wherein the cover comprises a crested shape and the heat exchange plates are shaped such that they progressively increase in height in a direction towards the inner cylinder, thereby reducing a pressure drop across the inlet channels by enabling the contaminated air to thermally expand as it is preheated.

41. Apparatus for purifying air contaminated with toxic organic and/or biological species, comprising:

(a) a generally cube-shaped housing comprising a front panel, a rear panel, a base plate, a top panel, and two side panels, one of said top panel and said front panel having a plurality of inlet ports defined therein for receiving contaminated air, said top panel having a plurality of outlet ports defined therein for expelling purified air;

(b) a counterflow heat exchanger disposed within the housing and comprising a plurality of heat exchange plates extending from the top panel to an edge disposed generally adjacent to the base plate, a plurality of inlet channels and a plurality of outlet channels being respectively defined between adjacent heat exchange plates, said plurality of inlet channels alternating with said plurality of outlet channels, said plurality of inlet ports providing an inlet into each inlet channel, such that the contaminated air flowing through the plurality of inlet channels flows in an opposite direction relative to that of the purified air flowing through the plurality of outlet channels, said purified air exiting from the plurality of outlet channels through the plurality of outlet ports;

(c) a reaction chamber disposed in a base portion of the housing beneath the edges of the heat exchange plates, said reaction chamber receiving the contaminated air from the inlet channels, said purified air flowing from the reaction chamber into the outlet channels;

(d) a heat source for heating the reaction chamber to a temperature sufficient to purify the contaminated air by thermally deactivating at least 90% of any toxic biological species in the contaminated air when said air is circulated through the reaction chamber, thereby converting the toxic biological species into non-viable biological species;

(e) a plenum disposed adjacent the top panel, said plenum receiving the purified air flowing through the plurality of outlet ports; and (f) a blower that causes the contaminated air to flow into the plurality of inlet ports and through the plurality of inlet channels, thereby preheating the contaminated air by heat exchange with the purified air exiting the reaction chamber, said contaminated air that is preheated flowing into the reaction chamber through the plurality of inlet channels in a direction opposite that of the purified air flowing through the plurality of outlet channels, said purified air being cooled by heat exchange with the contaminated air and flowing through the plurality of outlet ports into the plenum and out through said at least one exhaust port.

42. The apparatus of claim 41, wherein adjacent heat exchange plates are separated by an insulating material disposed along edges of said heat exchange plates.

43. The apparatus of claim 41, wherein the reaction chamber includes a capture surface comprising a porous material over and/or through which the contaminated air is circulated, said toxic biological species being captured by the capture surface for a sufficient time to be thermally deactivated.

44. The apparatus of claim 43, wherein the capture surface comprises a catalyst that causes a thermocatalytic reaction to occur when the contaminated air is circulated past the capture surface, said thermocatalytic reaction deactivating at least 90% of any toxic organic species in the contaminated air, thereby forming less toxic organic species.

45. The apparatus of claim 41, wherein the inlet channels and outlet channels of the counterflow exchanger are shaped such that they progressively increase in width in a direction towards the reaction chamber, thereby reducing a pressure drop across the inlet channels by enabling the contaminated air to thermally expand as it is preheated.

46. The apparatus of claim 41, further comprising another counterflow heat exchanger having a respective plurality of inlet and outlet ports defined in one of the top panel and the rear panel and a respective plurality of inlet and outlet channels, said plenum receiving purified air from said plurality of outlet ports, wherein one of the counterflow heat exchangers and its respective plurality of inlet and outlet ports are disposed toward the front panel and the other counterflow heat exchanger and its respective plurality of inlet and outlet ports are disposed toward the rear panel, both counterflow heat exchangers being disposed above the reaction chamber, and further wherein the blower causes the contaminated air to flow into the plurality of inlet ports and plurality of inlet channels in each of the counterflow heat exchangers, thereby preheating the contaminated air by heat exchange with the purified air exiting the reaction chamber, said preheated contaminated air flowing into the reaction chamber through the plurality of inlet channels in a direction opposite that of the purified air flowing through the plurality of outlet channels in each of the counterflow heat exchangers, said purified air being cooled by heat exchange with the contaminated air flowing through the plurality of outlet ports into the plenum and out through said at least one exhaust port.

* * * * *

UNITED STATES PATENT AND TRADEMARK OFFICE

CERTIFICATE OF CORRECTION

PATENT NO. : 6,488,900 B1

DATED : December 3, 2002

INVENTOR(S) : Call et al.

It is certified that error appears in the above-identified patent and that said Letters Patent is hereby corrected as shown below:

Column 3,
Line 29, “eitering” should read -- entering --

Column 9,
Line 26, (Equation 1), “$h\ k_f/d_h$” should read -- $h \propto k_f/d_h$ --
Line 28, (Equation 2), “$f\ l/R_e$” should read -- $f \propto l/R_e$ --

Column 10,
Line 5, “m” should read -- $\dot{m}$ --

Column 14,
Line 62, “arc” should read -- are --

Column 17,
Line 14, “point” should read -- port --

Column 21,
Lines 20 and 22, “sad” should read -- said --

Signed and Sealed this

Twenty-ninth Day of April, 2003

JAMES E. ROGAN
*Director of the United States Patent and Trademark Office*